Figure 1:
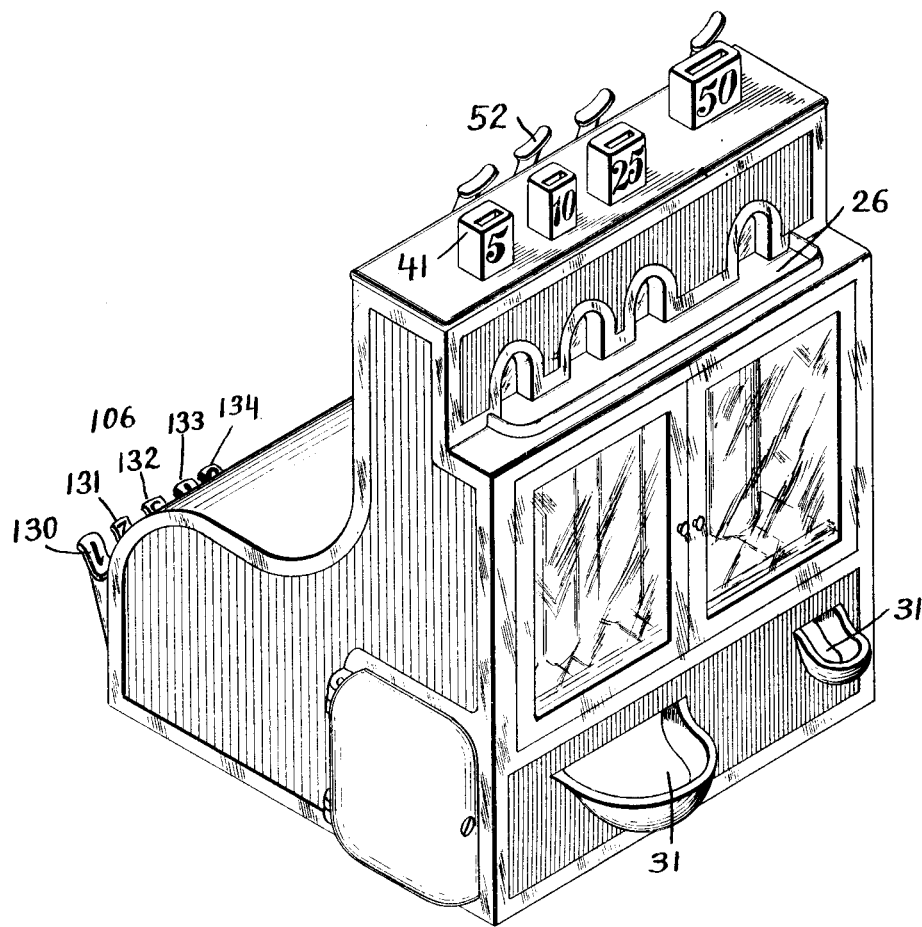

Joseph F. Hibner
Inventor

James W. See
Attorney

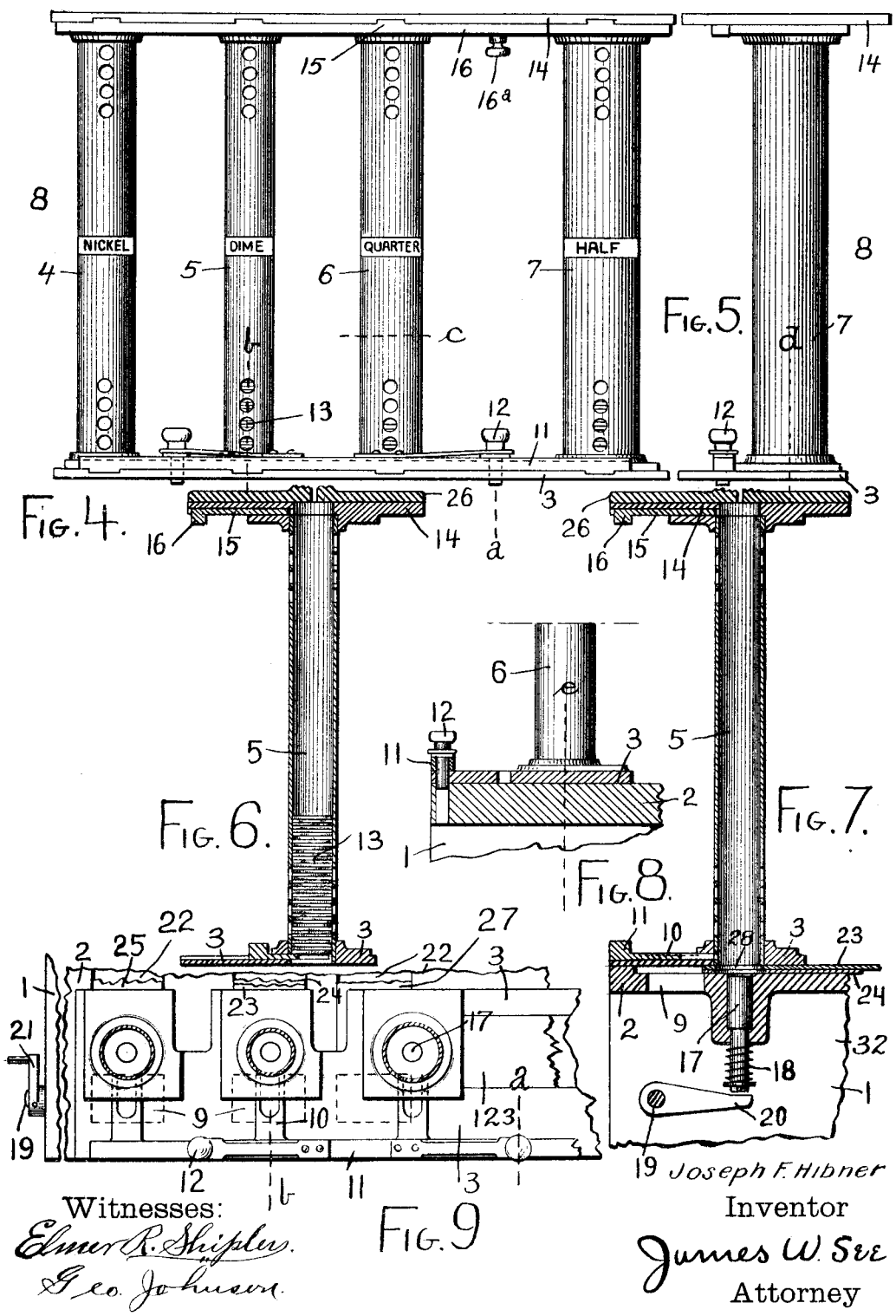

J. F. HIBNER.
SUBTRACTIVE MONEY CHANGER.
APPLICATION FILED OCT. 8, 1913.

1,123,296.

Patented Jan. 5, 1915.
10 SHEETS—SHEET 4.

Witnesses:
Elmer R. Shipley
Geo. Johnson

Joseph F. Hibner
Inventor
James W. See
Attorney

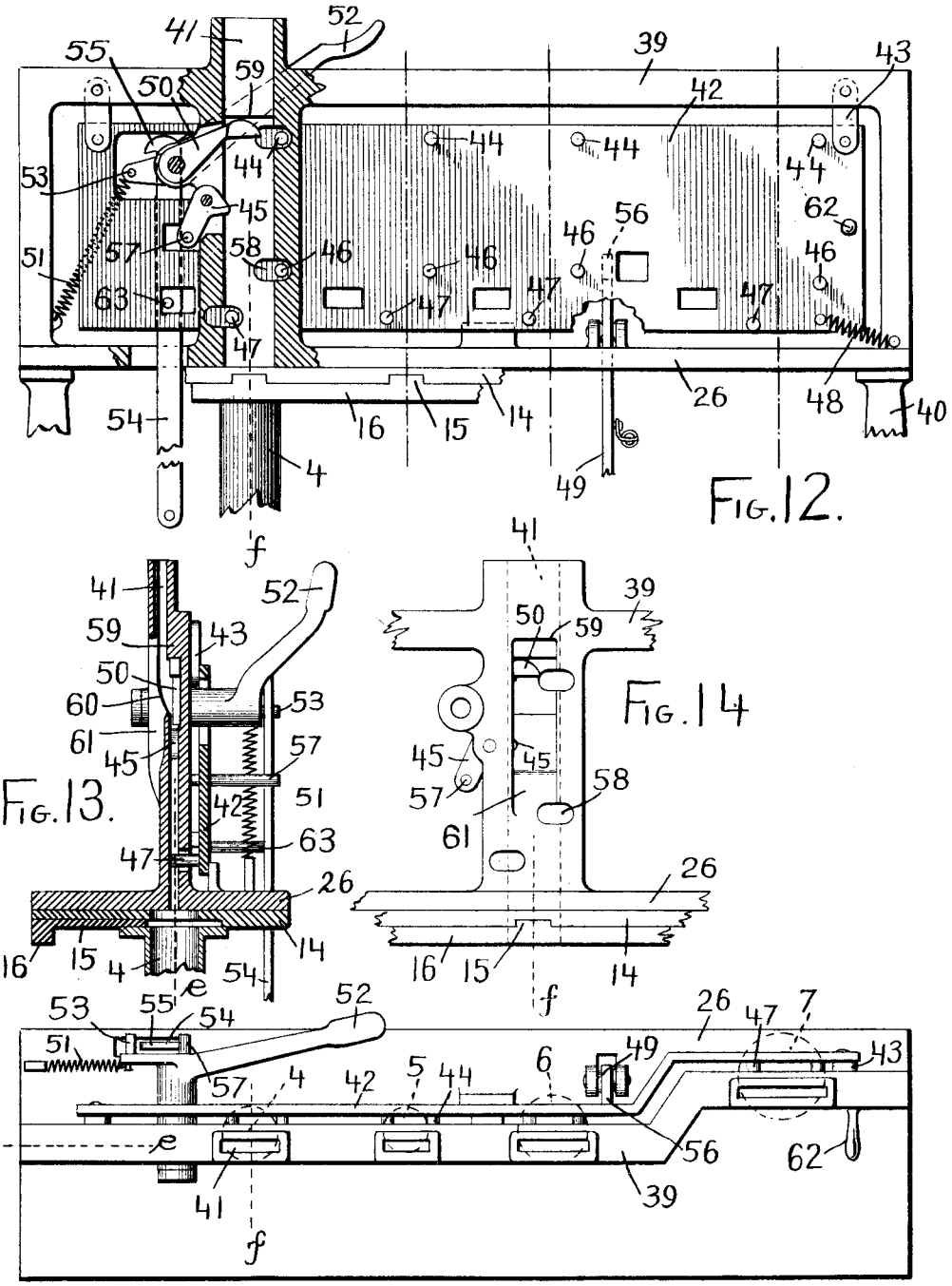

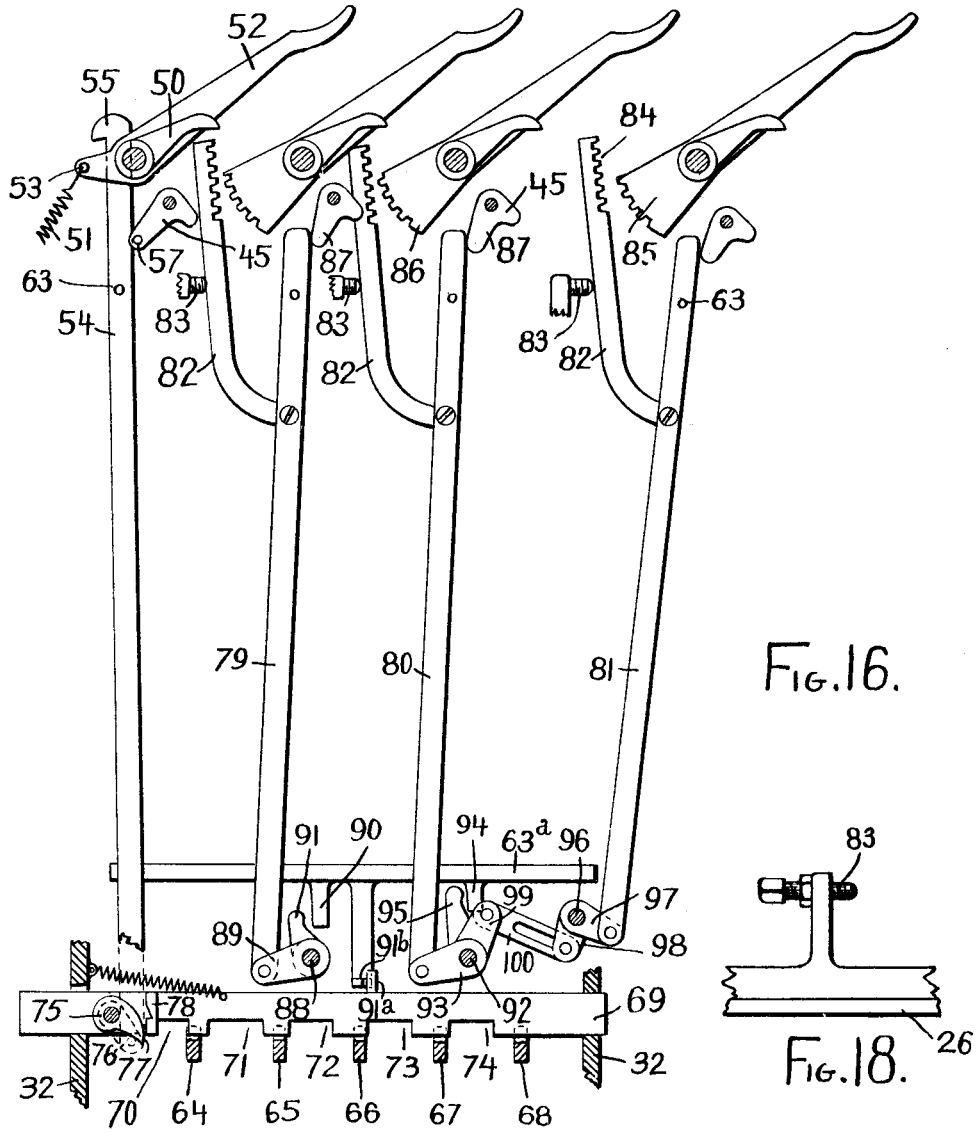

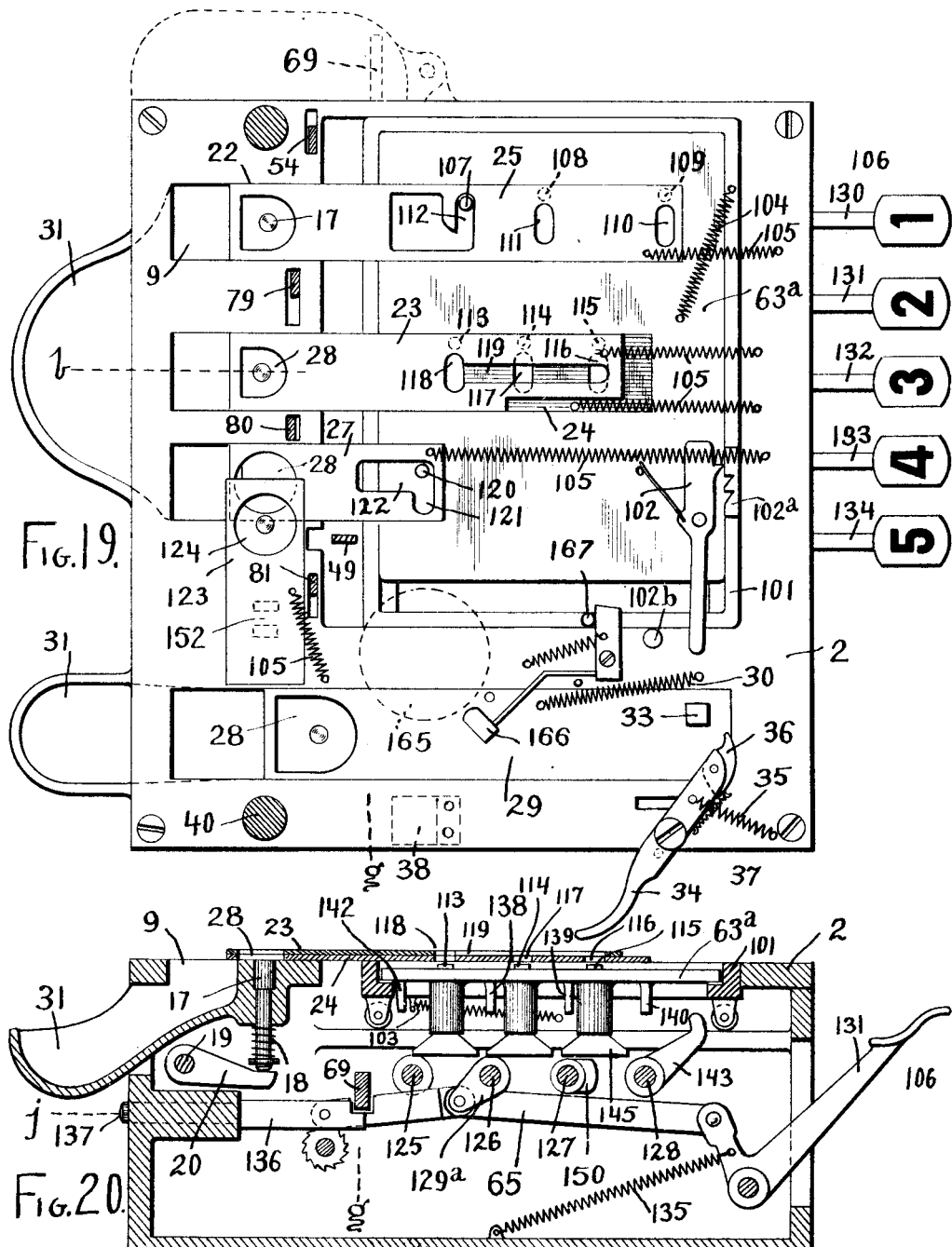

J. F. HIBNER.
SUBTRACTIVE MONEY CHANGER.
APPLICATION FILED OCT. 8, 1913.
1,123,296.
Patented Jan. 5, 1915.
10 SHEETS—SHEET 9.
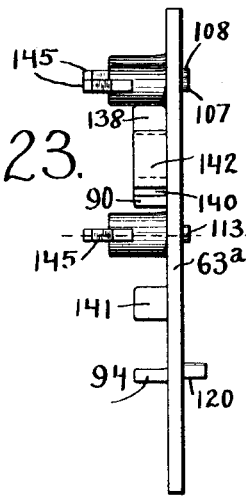
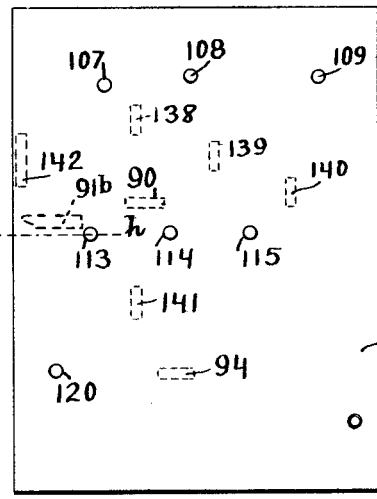
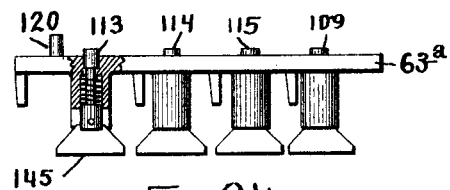
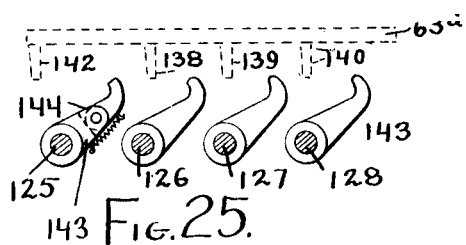
Witnesses:
Elmer R Shipley
Geo Johnson
Joseph F. Hibner
Inventor
James W. See
Attorney

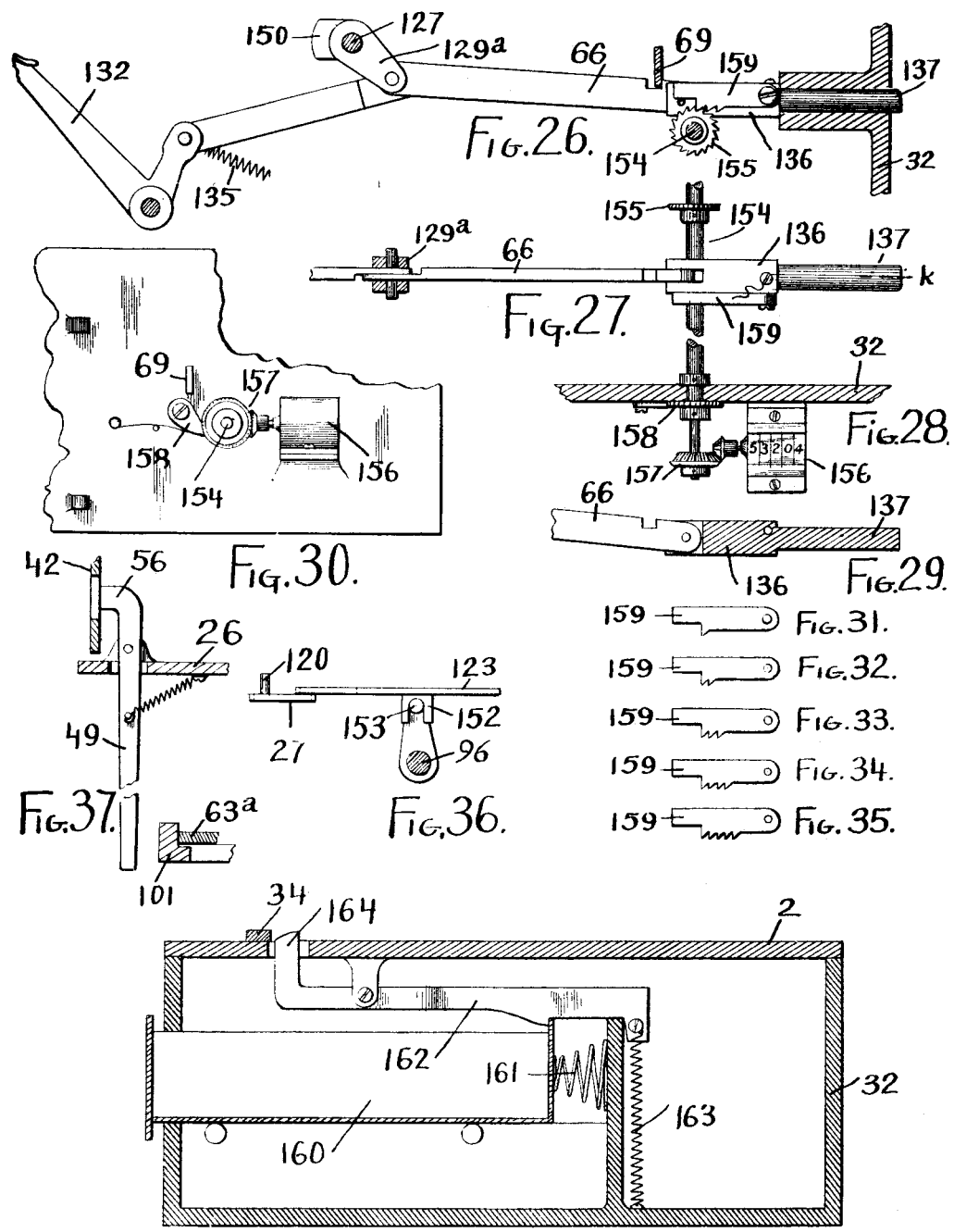

UNITED STATES PATENT OFFICE.

JOSEPH F. HIBNER, OF HAMILTON, OHIO, ASSIGNOR, BY MESNE ASSIGNMENTS, TO THE AUTOMATIC CASHIER CORPORATION, A CORPORATION OF VIRGINIA.

SUBTRACTIVE MONEY-CHANGER.

1,123,296. Specification of Letters Patent. Patented Jan. 5, 1915.

Application filed October 8, 1913. Serial No. 794,062.

*To all whom it may concern:*

Be it known that I, JOSEPH F. HIBNER, a citizen of the United States, residing at Hamilton, Butler county, Ohio, have invented certain new and useful Improvements in Subtractive Money-Changers, of which the following is a specification.

In the ordinary money-changing device a coin of given value is placed in the machine or paper money of given value is charged to the machine and the machine delivers change to the full amount.

My machine contemplates the sale of one or more things at a given unit of value and the return to the purchaser of the proper change due from the deposit of a given coin. In other words, the purchaser places the minuend in the machine; the subtrahend is retained and charged in the machine; and the remainder is disgorged for the purchaser. To illustrate:—Assume the articles to be sold to be admissions to a place of amusement, the price of admissions being five cents each. I am exemplifying my invention in a machine designed for dealing with these five cent unit prices; for receiving from the purchaser single coins of the value of five, ten, twenty-five or fifty cents; for retaining in the machine the value of the number of admissions wanted, up to the limit of five; and for returning to the purchaser such change as may be proper, the change being delivered from a magazine and in the most advantageous grouping of coins.

Described in the briefest manner the exemplifying device embodies a magazine consisting of vertical tubes adapted for the coins to be dealt with, there being a five-cent tube, ten cent tube, twenty-five cent tube, and a fifty cent tube. The magazine is detachable and is placed in the machine loaded with such number of coins as may be suitable for beginning the day's work; above each tube is a coin-receiving throat of proper size; a coin deposited by the purchaser is arrested in the throat; the cashier works a selected unit-key, selected according to the number of admissions wanted; the deposited coin is lowered in the throat; if the value of the number of admissions wanted equals the value of the deposited coin then the transaction is over and the number of admissions has been recorded on certain counting mechanism in the machine. If, however, there is change due the purchaser, the movement of the selected unit-key will bring about the disgorging of that change. In the exemplifying machine the greatest number of unit-value admissions which can be dealt with is five; the largest coin which can be received is fifty cents; conveniently the machine is provided with a mechanism having the ordinary money-changing function in order that the purchaser may present to the cashier a dollar and receive two half dollars in change so as to be in possession of a coin suited to the receiving capacity of the machine. The machine is provided with appropriate counting devices and with mechanism for performing various locking functions to secure integrity of action. To shorten the number of words likely to be found repeated in describing the exemplifying machine, I will refer to the above-mentioned coins as nickels, dimes, quarters and halves.

The machine comprises a finger-lever for each value coin the machine is adapted to receive and it also comprises a set of finger-keys, each being appropriate to a given number of units of purchase. In considering this specification and its drawings constant care should be exercised to avoid looking upon the unit-value keys as being coin-value keys.

In describing my machine I will, as far as practicable, treat independently its main component devices, and in doing so I will treat those component devices in the order of:—First, the magazine, including its construction and the features by means of which the magazine is locked in the machine and the features by means of which the magazine is closed to retain its load while the magazine is out of the machine; second, the means, broadly considered, for withdrawing coins from the base of the magazine for delivery to the purchaser; third, the dollar change-making element of the machine; fourth, the throat or slot features for receiving the deposited coins and for causing them to reach the magazine; fifth, the means by which the throat features transmit to the change-determining and change-delivering mechanism the indication of what this latter mechanism is to do; sixth, the change-determining and change-delivering mechanism; and seventh, such accessory features as may not have been previously explained with sufficient fullness.

My invention will be readily understood from the following description taken in connection with the accompanying drawings in which:—

Figures 2, 3:
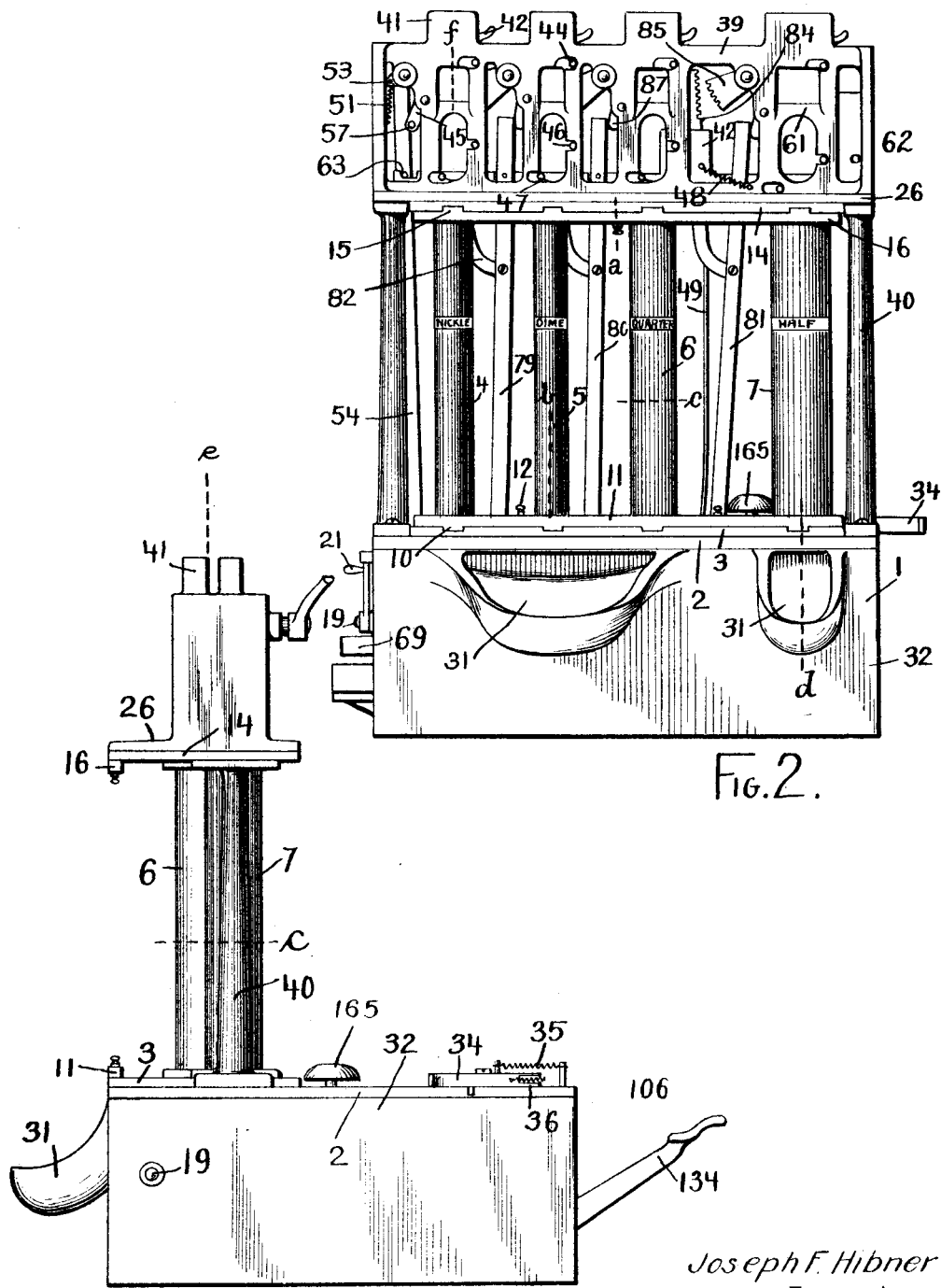
Figure 10:
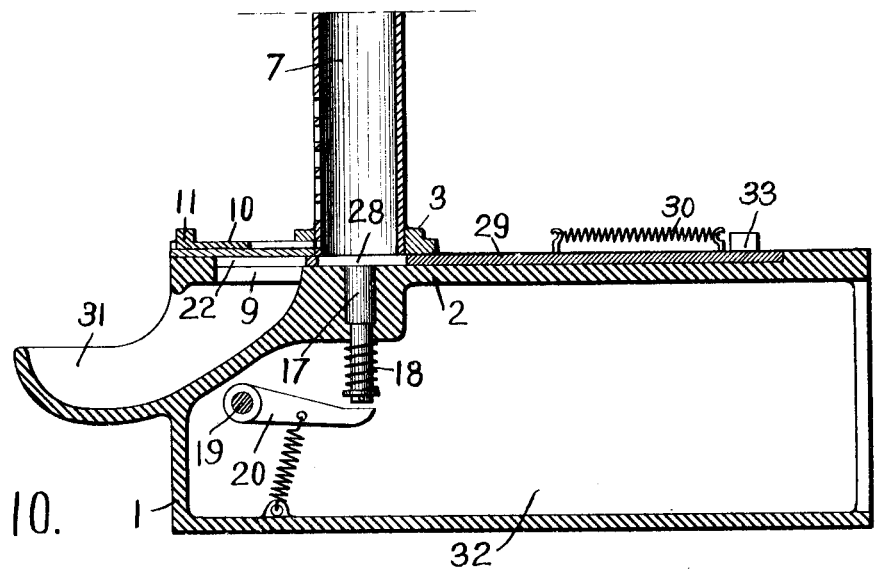
Figure 11:
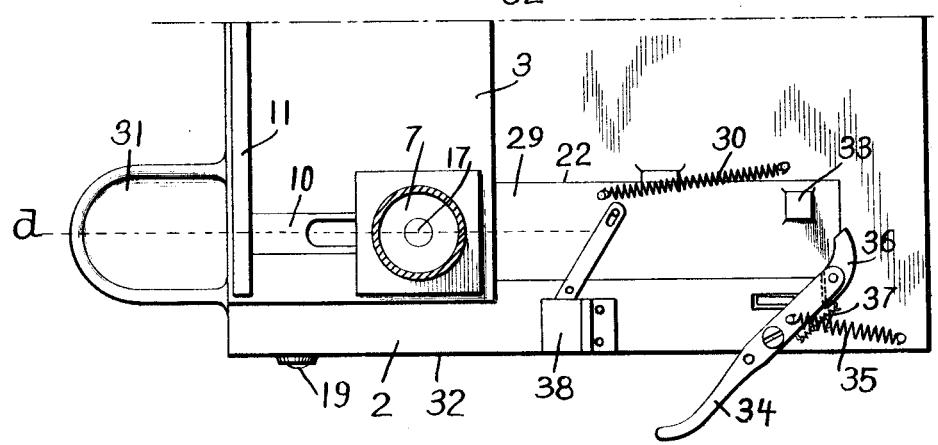
Figure 21:
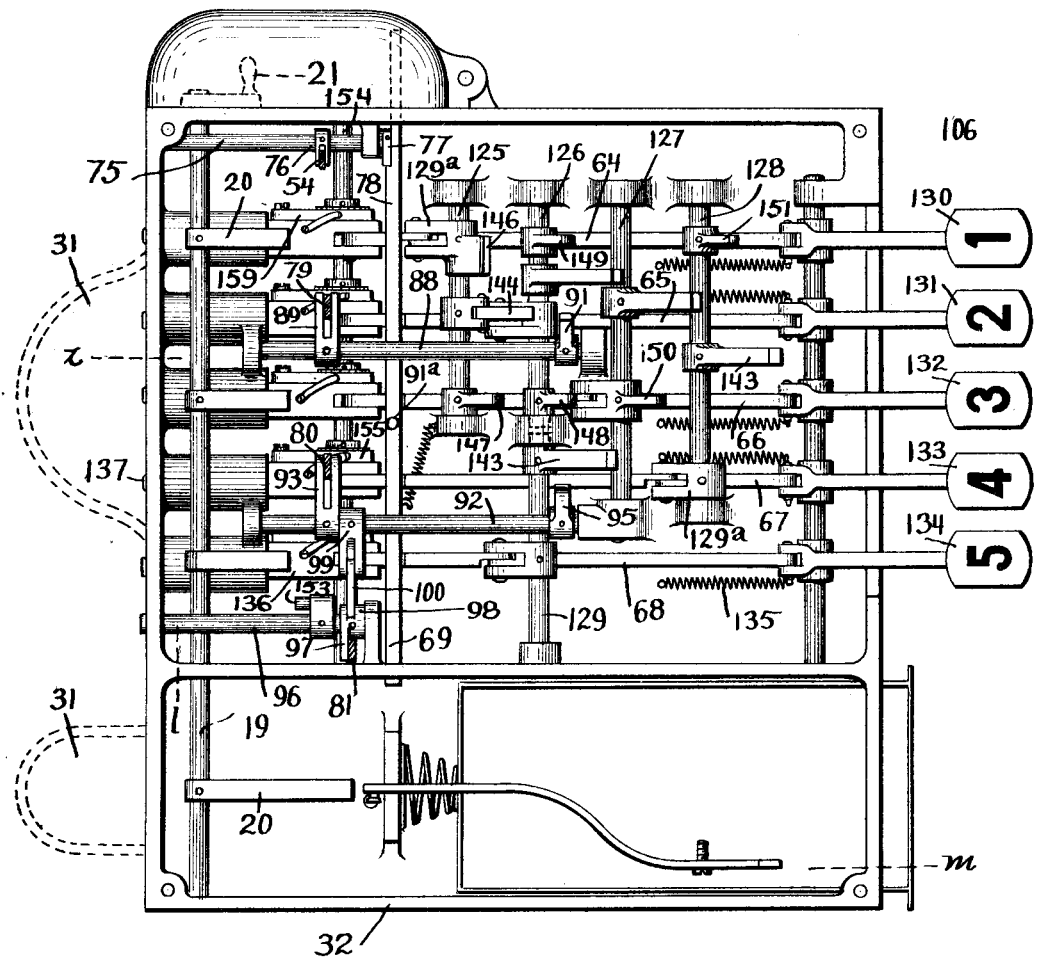

Figure 1, is a perspective view of an exemplifying machine: Fig 2, a front elevation with casing omitted: Fig. 3, a side elevation: Fig. 4, a front elevation of the magazine: Fig. 5, a side elevation of the magazine: Fig. 6, a vertical section of the dime-tube on line $b$ of Figs. 2 and 4: Fig. 7, the same, plus the lifting-plunger: Fig. 8, a vertical section of the magazine support on line $a$ of Figs. 4 and 9: Fig. 9, a horizontal section of magazine-tubes on line $c$ of Figs. 2, 3 and 4: Fig. 10, a vertical section of the base on line $d$: Fig. 11, a plan of part of the base, etc.: Fig. 12, a diagrammatic front elevation of stop-plate, etc., part vertical section on line $e$ of Figs. 3, 13 and 15: Fig. 13, a vertical section of the nickel-throat on line $f$ of Figs. 2, 12, 14 and 15: Fig. 14, a front elevation of the nickel-throat: Fig. 15, a plan of the throat-mechanism: Fig. 16, a diagram of the stop-bar system with parts in section on line $g$ of Figs. 19 and 20: Fig. 17, a plan of part of the change-plate: Fig. 18, a front elevation of one of the fulcrums 83 of Figs. 19 and 20: Fig. 19, a plan of the base-work, part horizontal section, on line $c$: Fig. 20, a fore-and-aft section of the base-work on line $b$ of Figs. 4, 9 and 19. Fig. 21, a plan of the base-work with top-plate omitted: Fig. 22, a plan of the plate: Fig. 23, a front elevation of the plate: Fig. 24, a side elevation of the plate, part section on line $h$ of Fig. 22: Fig. 25, a vertical section of unit-shafts on line $i$ of Fig. 21: Fig. 26, a side elevation of the three-unit bar: Fig. 27, a plan of the same: Fig. 28, a plan of the count-shaft and main counter: Fig. 29, a vertical section of a unit-head on line $k$ of Fig. 27: Fig. 30, a side elevation of the main counter: Figs. 31, to 35, inclusive, side elevations of the count-pawls: Fig. 36, a front elevation of the quarter-blades: Fig. 37, a side elevation of the stop-plate latch-lever: and Fig. 38, a vertical section of the drawer, on line $m$ of Fig. 21.

It should be here explained that a given figure of drawing designed particularly for use in explaining a given sub-mechanism of the machine, features not pertinent to this sub-mechanism may have been omitted, a plan leading to simplification of delineation and description. With the exception of Fig. 1 the inclosing casing of the machine has been omitted.

In the description I will frequently call attention, parenthetically, to a particular figure of the drawings, but it is to be understood that the given feature may appear in a number of the figures and that the one referred to is merely the one upon which the eye may be preferably rested for the instant.

*The magazine.*—In the drawings:—1, indicates general fixed frame-parts, particular members of which may be later specifically referred to: 2, (Fig. 10) a plate disposed across the top of the base portion of the machine, the front portion of this plate serving for the support of the magazine: 3, (Fig. 4) a magazine base-plate resting separably upon the front portion of plate 2: 4, a vertically disposed nickel magazine tube having its base fixedly secured in base-plate 3, this magazine tube being of a size suited for the reception of nickels: 5, 6 and 7, the magazine tubes for the dimes, quarters, and halves, respectively, these tubes being mounted in magazine baseplate 3 parallel with the nickel tube 4: 8, the magazine as a whole: 9, a discharge aperture extending down through plate 2 a short distance in front of the magazine tubes, the purpose of this aperture being to permit change-coins, pushed forward from the bases of the pile of coins in the magazine tubes to drop out of the machine and become accessible to the customer: 10, a rearwardly sliding finger mounted in the front portion of magazine baseplate 3, at the front of each tube, and adapted to slide back into the base of the tube: 11, a bar extending across the front ends of all the fingers 10 and rigidly secured to those fingers: 12, movable dowels engaging through the bar 11 and through magazine base-plate 3 and engaging apertures in plate 2, the purpose of these dowels being to lock the magazine in inward working position upon plate 2, to lock fingers 10 in normal outward idle position and, also, to lock the fingers 10 in inward position when those fingers are pushed into the tubes: 13, a pile of dimes in dime tube 5: 14, a magazine top-plate fixedly secured to the upper ends of the tubes: 15, fingers mounted in magazine top-plate 14 and adapted to slide rearwardly into the tubes: 16, a bar extending along this series of fingers and uniting them: and 16ª, a dowel coöperating with bar 16 and magazine top-plate 14 and serving in holding fingers 15 in normal outward idle position or in holding them in inward working position within the tubes.

The tubes are open at their upper and lower ends and are provided with sight-holes by means of which the piles of coins within the tubes may be inspected to determine that the tubes are initially sufficiently loaded for the beginning of the day's work and that they have not become, in the course of the day's work, so overloaded as to choke the machine.

The magazine as a whole may be handled separately from the machine and may be loaded and set away or placed in the machine, and more than one of the magazines may be provided for a given machine.

The magazine being out of the machine, lower fingers 10 are pushed into the tubes, furnishing a floor for each tube, and the upper fingers 15 are to be in withdrawn position so as to leave the upper ends of the tubes open. Under these conditions the tubes are to be charged with a sufficient number of appropriate coins for initiating the day's work. When this has been done the upper fingers 15 are to be slid rearwardly in the tubes, under which circumstances the coins are entirely inclosed within the tubes and the dowels prevent the forward displacement of the fingers.

When the loaded magazine is to be placed in the machine it is to be slid rearwardly over the front edge of plate 2 to working position, and under the top plate 26 forming a part of the frame of the machine. This top plate has a coin slot in it over each tube. When the magazine has been placed then fingers 15 are to be withdrawn forwardly to idle position, and similarly with fingers 10, dowels 12 serving to lock fingers 10 in withdrawn position and to lock the base of the magazine to plate 2. The magazine is now ready to receive coins dropped into its tubes through the slots in the upper frame-plate and to have coins expelled forwardly from the bases of the piles of coins in the tubes.

As fingers 10 are not at the extreme bases of the tubes, and as they are, when pushed rearwardly, to form floors for the tubes, and as the piles of coins extend to the bases of the tube it becomes necessary to lift the piles of coins in order that fingers 10 may enter the tubes. Mechanism for this lifting purpose will now be described.

Proceeding with the drawings:—17, (Fig. 7) indicates an upwardly movable plunger in plate 2 at each tube of the magazine: 18, a spring coacting with each of these plungers to hold the plungers down so that their upper ends will be not higher than top-plate 2: 19, a lifting-shaft disposed across the frame of the machine in front of and below the magazine: 20, lifting arms fast on shaft 19, one of these arms projecting under each of plungers 17: and 21, a crank upon the lifting shaft.

When the magazine is to be removed from the machine, the plungers 17 are raised, by the lifting mechanism in an obvious manner, thus elevating all of the piles of coins in the tubes and permitting fingers 10 to be moved back into the tubes. Fingers 10 have their rear portions slotted to straddle plungers 17 as the fingers move inwardly. If, for any reason, it be desired to remove the magazine from the machine without improperly delaying the continued use of the machine, such delay may be avoided by merely substituting another properly loaded magazine.

*Coin-delivering means, broadly considered.*—I will now describe, broadly, the illustrated means for withdrawing coins from the base of the magazine for delivery to the purchaser, and in this connection it may be well to determine on the term "purchaser" as defining the party who deposits a coin and receives change if any is due him, and the term "operator" as defining the party who has charge of the machine.

Proceeding with the drawings:—22, (Fig. 9) indicates shallow grooves in the upper surface of frame-plate 2, one of these grooves being disposed under each of the magazine tubes and over its coin-delivery hole 9 in the frame-plate; 23, a delivery blade fitted to slide forward in the groove below the dime tube, this blade having a thickness suited to that of a dime; 24, a similar delivery blade disposed in the dime groove below delivery blade 23, there thus being two dime-blades one disposed above the other; 25, a similar delivery blade under the nickel tube; 26, the top frame-plate which has been heretofore referred to; 27, the delivery-blade under the quarter-tube; 28, holes extending down through the delivery blades near their forward ends under the delivery tubes, except in the case of the quarter tube, it being understood that the delivery-blades are of a thickness to suit the coins to which they pertain and that the holes 28 in the blades are of a size to freely receive the coins from their tubes; 29, (Fig. 19) the delivery-blade below the half-dollar tube; 30, a spring co-acting with delivery-blade 29 to hold it in normal rearward position with its receiving hole 28 under its tube; 31, open pouches at the front of the machine, their rear portions being in communication with the delivery openings 9, the exemplification showing one of these pouches for the half-dollar tube and another pouch adapted to receive coins from the remaining tubes, these pouches permitting the purchaser to easily take possession of the change delivered to him by the machine; and 32, the general base-portion of the machine on which the magazine rests.

Looking at Fig. 7, and assuming a pile of dimes to be within dime-tube 5, that pile rests on frame-plate 2 forming the floor of the tube. The two lowermost dimes rest in the holes 28 of the delivery-blades. If, now, by any means whatever, the lower delivery-blade 24 be pushed forward, to the left, the lowermost dime will be pushed forward from the bottom of the pile and drop through delivery hole 9 and into the front pouch where the customer can get it. If, however, both of the dime blades be pushed at once then two dimes will be pushed out from under the pile and will drop into the pouch. It may be here stated that the upper dime blade will never be pushed alone. The lower dime blade will be pushed alone, as when a dime and a nickel are needed for change. Both dime blades will be pushed together when two dimes are needed for change.

The dime tube only is provided with double blades, the other tubes being provided with single blades. The particular mechanism for determining which of the delivery-blades shall move, and the mechanism for moving them, will be later described.

*The half-dollar change-maker.*—The largest coin the particular machine illustrated is designed to deal with is a half-dollar, and if a customer has a dollar the machine provides facilities by which the operator may give him two half-dollars for it.

Proceeding with the drawings:—33 (Fig. 11) indicates a projection from the upper surface of the half-dollar delivery-blade 29, which blade is of a thickness to receive two half-dollars from the half-dollar tube: 34, a finger-lever pivoted on the frame: 35, a spring holding this lever to idle position: 36, a flipping toe on the inner end of the lever, this toe being adapted to come in contact with the rear surface of projection 33 when the outer end of the lever is swung rearwardly: 37, a spring holding the toe to normal position as a prolongation of the lever: and 38, a counter for registering the impulses of the half-dollar delivery-blade, each impulse corresponding with the withdrawal of two half dollars from the half-dollar tube.

In subtractive change-making operation of the exemplifying machine a half-dollar is never delivered to the customer as change, for the exemplifying machine is not designed for the subtractive changing of any coin larger than a half-dollar. If the customer hands the operator a dollar the operator may retain this dollar or place it in a money drawer, and, by pulling back upon lever 34, he pushes two half-dollars from the base of the pile in the half-dollar tube and they are delivered into the half-dollar pouch where the customer can get them. The customer may then put one of these half-dollars in the half-dollar throat of the machine, and, upon the regular operation of the machine, get back such change as may be due him from that half-dollar. When the operator pulls back upon lever 34 its toe end pushes the delivery-blade forward a sufficient distance to effect the delivery into the pouch, and when the blade has moved this distance the toe of the lever clears projection 33 and the blade retreats to normal position and the pile of half-dollars settles so that the blade again contains two half-dollars. When lever 34 is released its spring returns it to normal position, the flipping of the toe permitting this movement in an obvious manner. Counter 38 indicates the number of pairs of half-dollars which have thus been withdrawn from the half-dollar tube.

*Throat or slot features.*—In the upper portion of the machine there is a vertical throat over each magazine-tube, the horizontal cross-section of these throats being adapted for the coins for which the several magazine-tubes are appropriated. Each throat has a series of movable stops adapted to project into it and arrest the deposited coin at various stages of descent, mechanism being provided by which these stops are removed in proper order to permit the coins to go in proper time to the magazine-tube.

As the four throats, with their stops are alike, I will explain the matter in the singular with reference to the nickel throat.

Referring to the drawings, and particularly to Figs. 12 to 15, inclusive:—39, indicates a fixed top frame-bar some distance over frame-bar 26, these two bars forming a fixed skeleton top structure: 40, columns, connecting this top structure with the base structure of the machine and leaving space for the reception of the magazine in the manner before explained: 41, a vertical nickel-throat carried by the skeleton top structure above the nickel magazine, it being understood that the skeleton top structure carries a similar throat for the dimes, quarters and halves: 42, an endwise movable stop-plate disposed at the rear of the throats: 43, links suspending the stop-plate from the top frame-bar 39 and typifying means by which the stop-plate is guided in its endwise movements: 44, a stop-pin projecting forward from the stop-plate and across the throat and adapted, as the stop-plate is moved endwise, to take coin-arresting position inside the throat or to move aside to non-arresting position, this stop-pin being hereinafter referred to as the first stop: 45, a lever pivoted near the throat and having a toe projecting into the side of the throat, in coin-arresting position, this toe being hereinafter referred to as the second stop, this second stop being located at the edge of the throat opposite first stop 44 and on a lower level: 46, a stop-pin projecting forwardly from the stop-plate, at the same edge of the throat as first stop 44 and on a lower level than second stop 45, this stop 46 being hereinafter referred to as the third stop: 47, a stop-pin projecting forwardly from the stop-plate at the same edge of the throat with the second stop and on a lower level than third stop 46, this stop 47 being hereinafter referred to as the fourth stop: 48, a spring urging the stop-plate endwise so that first stop 44 and third stop 46 will be in non-arresting position while fourth stop 47 is in arresting position within the throat: 49, a spring actuated latch-lever extending up from the change-determining and change-delivering mechanism in the base of the machine and adapted to latch the stop-plate when the stop-plate is moved to the left: 50, an arm pivoted at the throat, near its upper end, and projecting into the edge of the throat, opposite first stop 44:
51, a spring urging this arm to its upper position: 52, a finger-lever by means of which arm 50 may be moved downwardly in the slot: 53, a pin projecting rearward from the finger-lever: 54, a coin-indicating rod extending from near pin 53 down into the change-determining and change-delivering mechanism, this rod being adapted for vertical motion and also adapted to have its upper end swing sidewise: 55, a downwardly presenting hook on the upper end of the coin-indicating rod, this hook being above pin 53 and to one side of the pin: 56, the latching end of latch-lever 49, this latching end being adapted, when the stop-plate moves to the left, to engage behind a portion of the plate and retain the plate in its leftward position until the latch is released: 57, a pin projecting from stop-lever 45 and adapted, as the second stop formed by this lever moves downward in the slot, to engage against the right-hand edge of coin-indicating rod 54: 58, slots through the walls of the throat to permit of the play of the stop-pins: 59, a downwardly presenting shoulder formed in the rear wall of the throat just over the toe of arm 50, the throat being staggered at this shoulder so that the front portion of the throat is forward of the rear portion: 60, the bevel or curved inner surface of the front wall of the throat, where the throat offsets rearwardly: 61, an open front for an intermediate portion of the throat, this open front having a width not quite equal to the width of the throat: 62, a handle by means of which the stop-plate may be moved to the left; and 63, a pin projecting from coin-indicating rod 54 through the stop-plate and adapted, when the upper end of the coin-indicating rod is swung to the left, to shift the stop-plate to the left.

It is to be understood that Fig. 12 is of a diagrammatic character with a number of merely structural features omitted, such for instance, as the skeletonizing of the stop-plate to permit of more ready assembling and inspection of parts in the practical machine. This has been done for the purpose of simplification in the explanation of the functional features of the machine. Again, in Fig. 12 only the nickel throat mechanism has been shown, the position of the other throats being indicated by dotted vertical lines. This, also, tends toward simplification in explanation.

Assuming that the machine, so far as its throat-work is concerned, is empty, business with the machine not having yet been begun, finger-lever 52 may be worked up and down freely, the inner end of arm 50 working up and down with the finger-lever. If, now, a nickel be dropped into nickel-throat 41 it will pass down and be deflected rearwardly by the offset in the throat and will take position on the second stop formed by the inwardly projecting toe-lever 45. The nickel at this time will, as it rests on the second stop, have its upper edge under the toe of arm 50 which projects into the slot.
The nickel has been deposited in the throat but nothing has occurred further than the descent of the nickel to a point well down in the throat, as determined by a second stop 45. In this position the nickel may be inspected, it being understood, of course, that the material of the throat-walls will be of a character to permit of such inspection or that the walls, if opaque, will be provided with appropriate sight holes. If, now, finger-lever 52 be depressed, the toe of arm 50, engaging over the nickel, will force the nickel downward in the slot, and this movement of the nickel will cause the toe of lever 45 to swing aside and permit the nickel to drop further. But as lever 45 swings to the left, its pin, 57, swings coin-indicating rod 54 to the left and, through the medium of pin 63, moves the stop-plate to the left, in which forward position the stop-plate is latched by latch-lever 49. This movement of the stop-plate has moved third stop-pin 46 edgewise into the throat and the nickel has become arrested. It is at this stage of the operation of the machine that the change-determining and change-delivering mechanism in the base of the machine is to be operated, as will be hereinafter described, such operation bringing about a registration of the nickel which has been deposited, this same operation serving to release latch-lever 49 (see Fig. 37) and permitting the stop-plate to go again to the right, this rightward movement of the stop-plate causing third stop 46 to move out of the throat while fourth stop 47 moves into the throat, thus permitting the nickel to descend a stage further. This is the end of the transaction with the nickel in question, the nickel remaining supported on fourth stop 47 until a later operation of the stop-plate permits the nickel to drop to the nickel-tube of the magazine. When a second nickel is dropped into the throat it goes through the same course as the first nickel, the leftward movement of the stop-plate withdrawing fourth stop 47 from the throat and permitting the first nickel to drop into the magazine tube. In the ordinary course of the working of the machine, there will therefore always be a nickel resting on fourth stop 47, prior to its going to the magazine, and there may be a second nickel resting on second stop 45 prior to the actuation of the finger-lever which forces the upper nickel down and permits the lower nickel to drop to the magazine-tube. If, while the nickel is resting on third stop 46, another nickel be dropped into the throat, it will not descend, being arrested by first stop 44, and this other nickel can take position under lever 50 only after the change-determining and change-delivering mechanism in the base of the machine has been operated for the first nickel and has unlatched the stop-plate. It will, of course, be understood that under the assumed conditions of the purchase whose unit value is a nickel there will be no change delivered. If it happen that a dime be inadvertently dropped into the nickel throat it will pass out of front opening 61 and drop upon the forward portion of plate 26 where it may be recovered, and this will apply in case any coin be inadvertently dropped into the throat belonging to the larger coins, and it may be said that the explanation made of the regimen of the coin in the nickel throat will apply equally to coins in the other throats.

Attention has been called to the fact that after dealings with the machine are under way there is likely to be a coin held in the coin-throats, such coins not going to the magazine until at a later impulse of the machine. When the magazine is to be removed from the machine, as for auditing purposes, all the throats should be cleared and such coins as they may contain should go to the magazine. To provide for this, it is only necessary, before removing the magazine from the machine, to manipulate handle 62 so as to shift the stop-plate to the left, such action causing the emptying of all of the throats.

Attention has been called to change-indicating rod 54 pertaining to the nickel throat, but it will be remembered that no function has been ascribed to this rod other than that of causing the leftward shifting of the stop-plate. A further, and the important function of the coin-indicating rod, may be parenthetically referred to in a brief way. When finger-lever 52 is depressed to push a nickel down, as has been explained, the upper end of coin-indicating rod 54 is pushed to the left by pin 57. This brings hook 55 over pin 53, the result being that, as the impression of the finger-lever continues, the coin-indicating rod is temporarily lifted. This lifting motion of the coin-indicating rod operates on the change-determining and change-delivering mechanism in the base of the machine in a manner appropriate to the reception of a nickel. So, also, with the coin-indicating rods of the other throats. The details of this matter will be later explained with fullness.

In connection with Fig. 12 it was explained that the operation of finger-lever 52, in forcing the nickel down in the throat, lifted coin-indicating-rod 54, this lifting being effected by pin 53 of the finger-lever engaging hook 55 of the coin-indicating rod, and the construction was such that the coin-indicating rod would stay up as long as the finger-lever was depressed. The other finger-levers transmit the lifting motion to their coin-indicating rods by a somewhat different mechanism in order that after the coin-indicating rod has been properly lifted, a letgo device will disconnect it from the finger-lever and permit the coin-indicating rod to drop to normal position. The purpose of this arrangement will now be explained:—

Proceeding with the drawings (see Fig. 16):—63$^a$, indicates a change-measuring plate, disposed in the base of the machine and having a fore and aft motion in the frame, and also a selective transverse motion, as will be later explained with fullness: 64, a one-unit bar arranged to slide fore-and-aft in the machine and give proper fore-and-aft motion to plate 63$^a$ by means to be described later: 65, a similar two-unit bar: 66, a similar three-unit bar: 67, a similar four-unit bar: 68, a similar five-unit bar, each of these bars having a notch in its upper edge: 69, a lock-bar disposed across the machine over the five unit-bars and having its lower edge engaging the lock-notches in the unit-bars so as to normally prevent their endwise motion, lock-bar 69 being capable of endwise motion and held to its leftward normal position by a spring: 70, a notch in the lower edge of the lock-bar in such position that, when the lock-bar is shifted a certain distance endwise to the right, one-unit bar 64 will be freed from the domination of the lock-bar and be able to move endwise: 71, a similar notch to release two-unit bar 65 when the lock-bar is shifted a still further distance to the right: 72, 73 and 74, similar notches in the lock-bar serving, when the lock-bar is shifted a certain distance to the right, to free the three-unit bar and the four-unit bar and the five-unit bar: 75, a shaft in the base of the machine: 76, an arm mounted on this shaft and having pivotal connection with the lower end of nickel-indicating rod 54: 77, a toe-cam fast on shaft 75: and 78, a lug projecting from the face of lock-bar 69 and engaged by cam 77 and having a notch adapted to be engaged by the toe of the cam.

Upon depressing the nickel finger-lever and thus lifting nickel indicating-rod 54, as has been heretofore explained, the rising of the rod causes cam 77 to push the lock-bar to the right until one-unit bar 64 is freed from the domination of the lock-bar. The toe of the cam catches in the notch of lug 78 and the lock-bar remains in its position of release as regards one-unit bar 64, and this condition will continue until some subsequent endwise motion of the lock-bar to the right shall release the toe of the cam, thus permitting the weight of rod 54 to take cam 77 down to normal position. It is thus seen that the nickel indicating-rod 54 acts on the lock-bar regardless of the plate movement. As five cents is the purchase unit of the exemplifying machine, the operation of the nickel-delivery mechanism manifestly calls for no change. Nickel-indicating-bar 54 therefore has no adjusting connection with change-measuring-plate 63ª. The other coin-indicating bars operate on that plate, to shift it sidewise, and through it effect the proper shifting of the lock-bar to release the appropriate unit-bars.

Proceeding with the drawings (Fig. 16):—79, indicates the dime-indicating rod extending between the upper and lower portions of the machine: 80, a similar quarter-indicating-rod: 81, the half-indicating-rod: 82, a rack having its lower end pivoted to dime-indicating-rod 79, the quarter-indicating-rod and the half-indicating-rod being provided with a similar rack: 83, (Fig. 18) a fixed fulcrum at the left of each rack, on which the rack may rock and on which it may slide vertically: 84, the teeth of the rack: 85, a segment carried by each of the finger-levers, except the nickel-lever: 86, a knockout carried by each segment and adapted, when the segment has engaged its rack and carried it up a certain distance, to force the rack out of engagement with the segment and permit its indicating-bar to drop: 87, a tripping-arm fast with each of the second stops 45 in the throat, except as to the nickel throat: 88, a shaft disposed fore-and-aft at the base of the machine: 89, an arm fast on this shaft and pivoted to the lower end of dime-indicating-rod 79: 90, a lug projecting down from the change-measuring plate 63ª: 91, an arm projecting from shaft 88 and adapted, when the dime-indicating rod 79 is lifted to engage lug 90 and shift the change-measuring plate to the right to a certain degree: 91ª, a pin projecting up from the lock-bar: and 91ᵇ, a wedge carried by the plate and coöperating with the pin as the plate moves forward or as the plate moves sidewise.

When the dime finger-lever is depressed, to push a dime down in the dime-throat, the arm 87 pushes the upper end of dime-indicating rod 79 to the left causing the dime-rack to engage the dime segment at a certain stage in the rising of the segment, this action lifting the dime-indicating rod 79 and causing arm 91 to push change-measuring plate 63ª to the right a certain distance. This sidewise shifting of the change-measuring plate will, through the medium of wedge 91ᵇ, move the lock-bar endwise to the proper degree to free the two-unit bar from the domination of the lock-bar. When the dime-indicating bar 79 shall have been lifted and has performed the office mentioned, the continued depression of the dime finger-lever causes the rack to disengage and the dime-indicating bar to descend to normal position, devices to be later explained serving to lock the change-measuring plate in its shifted position to the right.

The unlocking movement of the lock-bar, which has just been described with reference to the two-unit bar, was effected by the side shifting of the change-measuring plate as effected by the dime-indicating rod 79 and, as has been stated, locking devices will be described for locking the change-measuring plate in its adjusted sidewise position prior to its making its forward trip. As a nickel calls for no change, and as nickel-indicating rod 54 effects no sidewise shifting of the change-measuring plate, the rod itself shifts the lock-bar, as has been explained, and later, when the change-measuring plate makes its forward stroke wedge 91ᵇ shifts the lock-bar endwise sufficiently to release the toe of cam 77. The wedge performs its function as a wedge only in effecting the release of the toe-cam 77, its function in moving the lock-bar sidewise under the influence of other coin-indicating rods, being merely that of a sidewise pusher as the change-measuring plate is shifted to the right.

A schedule of the amount of change which may be called for from various coins will be later presented but attention may here be called to the fact that a quarter need never be disgorged from the machine except in making change for a half-dollar. This fact permits of the consolidation, so to speak, of the mechanism by which the quarter-indicating rod and the half-indicating rod shift the change-measuring plate sidewise.

Proceeding with the drawings (Fig. 16):— 92, indicates a shaft below the change-measuring plate: 93, an arm fast on this shaft and pivoted to the lower end of the quarter-indicating rod 80: 94, a lug projecting down from the change-measuring plate: 95, an arm fast on shaft 92 and adapted to engage lug 94 and shift the change-measuring plate to the right: 96, another shaft mounted below the change-measuring plate: 97, an arm fast on this shaft and pivoted to the lower end of the half-indicating rod 81: 98, an arm fast with arm 97: 99, an arm fast with arm 93: and 100, a link connecting arms 98 and 99 and slotted so that arm 99 may oscillate to the right without oscillating arm 97.

If the quarter-finger-lever be depressed, the change-measuring plate will be shifted sidewise to the right an appropriate distance, and the lock-bar will, at the same time, be shifted to the right such distance as to unlock all of the unit-bars. If the half finger-lever be depressed the result produced in the shifting of the change-measuring plate and the lock-bar will be precisely the same as when the quarter finger lever be depressed.

*Change-determining and change-delivering mechanism.*—It has been explained that, a given coin having been placed in the proper throat and its finger-lever manipulated, a coin-indicating rod was lifted. The lifting of this indicating-rod sets certain mechanism in the parts of the machine, appropriate to the deposit of the given coin, and then, upon manipulating a key pertinent to the number of unit purchases, the change-delivering mechanism will become adjusted for delivery of the proper change and, upon further manipulation of that key, the proper change will be delivered into the pouch.

Briefly explained, plate 63ª is disposed below the delivery blades; this plate carries a number of vertically movable pins to coöperate with the blades; these pins are normally down and free from the blades; the sidewise adjusting of the plate, as determined by the coin-indicating rods, sets the plate in such position that appropriate pins will be in position to rise and enter holes in the rear portions of the blades; the first movement of a selected unit-key elevates the appropriate pin or pins, whereby the plate becomes connected to the proper blades; the further movement of the key pushes the plate forward, and with it the proper blades, thus delivering the proper coins to the pouches; the blades and plate and pins all return to normal position when the finger-key is released.

Proceeding with the drawings, and particularly Figs. 19 to 25, inclusive:—101, indicates a carriage adapted to slide back and forth in the top of the base, this carriage supporting the plate 63ª in such manner that it may slide sidewise: 102, an index-lever mounted on the plate and having a tooth adapted to engage selective notches in the carriage when the plate is shifted sidewise, this index-lever being provided with a spring urging it into engagement with the notches: 102ª, the notches in the carriage, these notches being adapted to be engaged by the index-lever and, in the illustrated machine, being two in number, the index-lever being normally out of engagement with either notch: 102ᵇ, a fixed pin in the top of the base, adapted to engage and trip the index-lever when the carriage has moved the plate forward its full functional distance: 103, springs urging the carriage and plate to normal rearward position: 104, a spring urging the plate to normal leftward position in the carriage, it being understood that in this description the reader is assumed to be standing in front of that portion of the machine from which project the pouches, this portion having been heretofore referred to as the front of the machine: 105, springs urging the several delivery-blades to their normal rearward position as determined by suitable stops carried by top-plate 2: 106, a group of finger-keys projecting out from the rear of the base of the machine, there being a key for a one-unit purchase, another for a two-unit purchase, and so on up to five-units of purchase: 107, a vertically movable blade-pin carried by the plate under the nickel-blade: 108, a second similar blade-pin under the nickel-blade: 109, a third similar blade-pin under the nickel blade: 110, a cross slot in the nickel-blade to coöperate with pin 109 when the plate is moved properly to the right and the pin projected up into the slot: 111, a similar slot to coöperate with pin 108: 112, a similar slot to coöperate with pin 107, this slot having a forward extension widened at its front portion: 113, a blade-pin carried by the plate under the dime-blades: 114, a second similar pin under the dime-blades: 115, a third similar pin under the dime-blades: 116, a cross slot in the lower dime-blade 24 and adapted to coöperate with pin 115: 117, a cross slot in the lower dime-blade and adapted to coöperate with pin 114: 118, a cross slot in both dime-blades adapted to coöperate with pin 113: 119, a fore-and-aft slot in the upper dime-blade to prevent the upper dime-blade being pushed forward if pin 114 or 115, in being projected upwardly to actuate the lower dime-blade, should project up too far, this slot 119 being a mere precaution against inaccurate workmanship: 120, a blade-pin permanently projecting from the plate through quarter-blade 27: 121, a cross-slot in the quarter-blade to coöperate with pin 120: 122, a fore-and-aft slot in the quarter-blade to provide for the normal forward movement of pin 120 without moving the quarter-blade: 123, a top quarter-blade arranged fore-and-aft at right angles to quarter-blade 27: 124, an aperture in the left-hand end of the top quarter-blade and normally positioned directly under the quarter-magazine tube and in line with but to the right of aperture 28 in quarter-blade 27 and normally charged with a quarter from the quarter-tube: 125, a one-unit shaft mounted in the base of the machine across under the nickel-blade: 126, a two-unit shaft crossing under the nickel-blade and dime-blade: 127, a three-unit shaft crossing under the dime-blade: 128, a four-unit shaft crossing under the nickel-blade: 129, a five-unit shaft in the base of the machine, this shaft being illustrated as being in line with two-unit shaft 126: 129ª, an arm fast on each unit-shaft and pivotally connected with the appropriate unit-rod, each unit-rod being in two endwise sections pivotally united at their junctures with their arms 129ª: 130, a one-unit finger-key: 131, a two-unit finger-key: 132, a three-unit finger-key: 133, a four-unit finger-key: 134, a five-unit finger-key, each of these unit-keys being in the form of a bell-crank having its short arm pivotally connected to the rear end of the appropriate unit-bars 64, etc.; 135, springs for holding these keys normally in elevated positions: 136, a head on the forward end of each of the unit-bars 64, etc., the forward ends of the unit-bars being pivoted in these heads: 137, a guide-stem on the forward end of each of the heads, these stems sliding in apertures in the front wall of the base and forming guides for the front ends of the unit-bars: 138, 139, 140, 141 and 142, lugs projecting from the lower face of plate 63ª, these lugs occupying various positions under the plate and presenting rearward faces by means of which impelling agents may engage and push the plate forward: 143, impelling arms fast on shafts 125, 126, 127, 128 and 129 and having such form and position that when a selected shaft is rocked the end of the arm will engage an appropriate one of the lugs projecting down from the plate and move the plate forward: 144, a spring flipping end provided upon the arm 143 of one-unit shaft 125 to provide that this arm may continue its forward motion after the plate comes to rest and to provide that the arm may retreat past lug 142: 145, a downwardly presenting shoe on the lower end of each of the blade-pins 107, etc., these shoes extending fore-and aft, each of the blade-pins, except 120, being provided with a spring holding the pin downward out of engagement with the blades: 146, a cam on unit-shaft 125 adapted, when the shaft is rocked, to engage the shoe of pin 107 and push that pin upward into engagement with its slot in the nickel-blade, providing, however, that the plate is in such sidewise position of adjustment that the shoe in question will be over this cam: 147, a second cam on one-unit shaft 125 to coöperate with blade-pin 113: 148, a cam on the two-unit shaft, to coöperate with blade-pin 114: 149, a second cam on two-unit shaft 126 to coöperate with pin 108: 150, a cam on the three-unit shaft to coöperate with blade-pin 115: 151, a cam on the four-unit shaft 128 to coöperate with pin 109: 152, (Fig. 36) a slotted lug projecting down from top quarter-blade 123: and 153, a propelling pin engaging this slotted lug and carried by an arm of fore-and-aft shaft 96 which has been heretofore referred to in connection with Fig. 16, this shaft being rocked by the lifting of the half-dollar indicating-rod 81.

The schedule which follows shows, in the first three columns, the change withdrawals for various coin deposits and various numbers of unit-purchases in the particular machine illustrated as exemplifying the invention. The last two columns in the schedule indicate the particular blade-pins and cams becoming effective in carrying out the results indicated in the first three columns.

*Schedule of change, pins and cams.*

| Coin deposited. | Unit purchases. | Change. | Pin. | Cam. |
|---|---|---|---|---|
| Nickel | 1 | None | None | None. |
| Dime | 1 | 1 nickel | 107 | 146. |
| Dime | 2 | None | None | None. |
| Quarter | 1 | 2 dimes | 113 | 147. |
| Quarter | 2 | {1 dime | 114 | 148. |
|  |  | {1 nickel | 108 | 149. |
| Quarter | 3 | 1 dime | 115 | 150. |
| Quarter | 4 | 1 nickel | 109 | 151. |
| Quarter | 5 | None | None | None. |
| Half | 1 | {1 quarter | 113 | }147. |
|  |  | {2 dimes | 120 |  |
| Half | 2 | {1 quarter | 114 | }148. |
|  |  | {1 dime | 108 | }149. |
|  |  | {1 nickel | 120 |  |
| Half | 3 | {1 quarter | 115 | }150. |
|  |  | {1 dime | 120 |  |
| Half | 4 | {1 quarter | 109 | }151. |
|  |  | {1 nickel | 120 |  |
| Half | 5 | 1 quarter | 120 | None. |

Notice that a half-dollar is never deposited in the machine unless at least a quarter is coming back in change, and also that a quarter is never received in change unless a half-dollar has been deposited. This fact which permits of the consolidation of some of the mechanism pertaining to the half-dollar and quarter throats, a consolidation which is not essential but which permits of a very material lessening of the number of parts involved in the change-determining and change-delivering mechanism. The doubling of the quarter-blades also provides for the simultaneous delivery of all change-coins.

It is deemed advisable at this point to explain results in detail, leaving the explanation of the mode of operation of the detailed mechanism to be taken care of later.

In Figs. 19 to 25, inclusive, assume the throats of the machine all to be empty. Lock-bar 69 locks all the unit-keys. Force a nickel down in the nickel-throat and the one-unit key becomes unlocked and its actuation merely effects a one-unit registration on a main counter, and the striking of a bell, as will be later explained. The normal position of the carriage and plate is as in Fig. 19, and the mentioned actuation of the one-unit key has merely moved the plate forward idly. All the movable pins in the plate are down out of engagement with the blades.

Force a dime down in the dime-throat. This moves lock-bar 69 to unlock the one-unit key and the two-unit key, and shifts the plate to the right to the first notch of 102ª where the plate is retained by the index-lever 102. If, now, the two-unit key be depressed the plate will go forward and return idly, the bell will ring, and two-units will be charged on the main counter. If, however, instead of depressing the two-unit key, the one-unit key be depressed, pin 107 will rise and the nickel-blade will move forward with the plate and deliver a nickel change in the pouch.

If a quarter be forced down in the quarter-throat, the plate will be shifted to its third position, being the second notch of 102ª, and all unit-keys will be unlocked. If the five-unit key be now operated, the plate will move forward idly as before. The plate, in moving forward under the condition stated, moves lower quarter-blade 27 forward, by the action of permanent pin 120, but this action is an idle one owing to the fact that hole 28 in the lower quarter-blade contains no quarter, and this holds good with all of the forward movements of lower quarter-blade 27 under the influence of a deposited quarter. If, however, instead of operating the five-unit key, the four-unit key be operated, pin 109 will be raised and the nickel-blade will move forward with the plate and a nickel in change will be delivered. If, however, instead of the five-unit key or the four-unit key, the three-unit key be operated, pin 115 will be lifted and engage the lower dime-blade and that blade will move forward with the plate and a dime in change will be delivered. If, instead of either of the three previously mentioned finger-keys, the two-unit key be operated, pins 114 will engage the lower dime-blade and pin 108 will engage the nickel-blade and those two blades will move forward with the plate, and a nickel and a dime change will be delivered. If, instead of either of the four keys previously mentioned, the one-unit key be operated, pin 113 will engage the upper and lower dime-blades and those blades will move forward with the plate and two dimes in change will be delivered.

If a half-dollar be forced down in the half-dollar throat, the rising of half-dollar coin-indicating rod 81 will bring about several things. It will, by the rocking of shaft 96 (Fig. 21) shift the top quarter-blade 123 to the left and deliver a quarter to the coin-hole 28 of the lower quarter-blade 27; it will shift the plate to its third position, being the second notch; it will unlock all the keys; pin 120 will have passed across slot 122 and be in position to move lower quarter-blade 27 forward when the plate moves forward. If, now, five-unit key be operated, pin 120 will push the lower quarter-blade forward and deliver a quarter in change. If, instead of the five-unit key, the four-unit key be operated, pin 120 will act on the lower quarter-blade and pin 109 will engage the nickel-blade and consequently the nickel-blade and the quarter-blade will move forward with the plate and a quarter and a nickel in change will be delivered. If, instead of the five-unit key or the four-unit key, the three-unit key be operated, pin 120 will act on the lower quarter-blade and pin 115 will engage the lower dime-blade, consequently when the plate moves forward the lower dime-blade and the lower quarter-blade will deliver a quarter and a dime in change. If, instead of either of the three mentioned keys being operated, the two-unit key be operated, pin 120 will act on the lower quarter-blade and pin 114 will engage the lower dime-blade, and pin 108 will engage the nickel-blade and, when the plate moves forward, the three blades will deliver a quarter, a dime, and a nickel in change. If, instead of either of the previously mentioned unit-keys being operated, the one-unit key be operated, pin 120 will engage the lower quarter-blade, and pin 113 will engage the upper and lower dime-blades and, consequently, these two blades will move forward with the plate and a quarter and two dimes will be delivered in change.

Lower quarter-blade 27 moves forward whenever the plate is to the right in the second notch but idly, as its coin-hole is empty. The transfer of a quarter from the quarter-tube to the lower quarter-blade is effected by the half-dollar coin-indicating rod, while the effectiveness on the nickel-blades or the dime-blades is brought about by the sidewise shifting of the plate to bring proper pins over cams for elevating them to effective position.

When the plate is in the normal position of Fig. 19, lug 142 is in position to be engaged by impelling arm 143 of the one-unit shaft, and this is the case in any of the sidewise positions of the plate. But as regards the impelling-fingers on the other unit-shafts their appropriate lugs are normally to the side of them and take position to be engaged by the impelling-fingers only when the plate has been shifted sidewise. When any impelling finger pushes the plate forward, the plate, upon reaching the forward extremity of its stroke, becomes released by the index-lever and pin 102ᵇ and instantly shifts to the left to normal position, thus permitting the plate to return rearwardly to normal position regardless of the impelling finger which moved it forward. As the one-unit impelling finger requires to deal with its lug on the plate regardless of whether the plate be shifted sidewise or not, provision is made by means of the flipping end 144 on the impelling finger on the one-unit shaft, this finger passing the lug at the forward extremity of the stroke of the plate and flipping back past the lug as the finger retreats. Attention is called to the fact that cam 146 (Fig. 21) is wider than the other cams. This is not essential but is to be highly recommended as permitting the shoe of pin 107 to be dealt with by a single cam in various sidewise positions of the plate, and as preventing the possibility of the shoe slipping down at the right-hand side of the cam in certain positions of the plate.

It is believed that, from the description thus far given of the illustrated exemplifying machine, the mode of operation of the individual details of the change-determining and change-delivering mechanism will be understood from a study of the drawings, but it is believed that a comprehension of the matter will be facilitated by the last two columns of the schedule above given which schedule not only shows the changings but also the blade-pins and cams involved in bringing about the various deliveries.

*The main counter.*—It is the function of the main counter to register the total number of unit-purchases which have been made. As the several unit-keys move through the same distance, notwithstanding the fact that they deal with differing numbers of unit purchases, the counting motion which is derived from the movement of these unit-keys must be in proportion to the unit value of the keys.

Proceeding with the drawings (Figs. 26 to 35, inclusive):—154, indicates a count-shaft journaled in the base and lying under the unit-bar heads 136: 155, a ratchet-wheel fast on this shaft alongside each of the heads: 156, a totalizing counter carried by the base of the machine and adapted to indicate the total number of tooth-spaces, as measured by ratchet-wheels 155 which have been rotatively advanced by count-shaft 154: 157, gearing connecting the count-shaft with the counter: 158, a stop-ratchet and pawl to prevent retreating movement of the count-shaft: and 159, a spring-pressed pawl pivoted at the side of the head of each of the unit-bars, these pawls being provided with teeth, varying in number, and engaging ratchet-wheels 155.

Each tooth of advance of the count-shaft, as effected by any of the ratchet-wheels 155, is to add one to the counter. In Fig. 26, which shows the three-unit unit-bar, pawl 159 has three teeth engaging its ratchet-wheel. The movement of the unit-bar to the left its definite distance of stroke, as brought about by the finger-key, will cause the three teeth of the pawl to successively engage teeth of the ratchet-wheel and advance the count-shaft three tooth-spaces of angular motion, the untoothed portion of the pawl sliding idly over the ratchet-wheel after its three teeth shall have acted. Figs. 31 to 35, inclusive, illustrate all of the five pawls. Fig. 31 showing the one-unit pawl as being provided with a single-tooth, the other pawls being provided with teeth in number corresponding with the number of units pertaining to the respective pawls.

*The money drawer.*—The money drawer is needed only for the reception of such moneys as are changed into half dollars by the dollar change-making device. It is self-latching and is unlatched by the action of the dollar change-making device of the machine.

Proceeding with the drawings (Fig. 38):—160, indicates the money drawer fitted to slide in the base of the machine: 161, a spring to cause the drawer to fly open the instant it is unlatched: 162, a latch-lever having a tooth adapted to engage the drawer and hold it in closed position, against the urgency of spring 161: 163, a spring urging the latch to latching position: and 164, a cam on the latch-lever, adapted to be engaged by dollar-changing lever 34 when it is manipulated in changing a dollar.

Normally the drawer is latched, as in Fig. 38. When the dollar-changing lever 34 is actuated, in delivering a pair of half dollars in exchange for a dollar, it engages the cam of the latch-lever and releases the latch and the drawer flies open, the latch returning to its normal position. When the drawer is returned to its inward position it pushes upward on the latch-lever and passes its latching tooth which then falls behind the latch engaging portion of the drawer.

*The bell.*—In the drawings:—165 (Fig. 19) indicates a bell supported on the top of the base: 166, the bell hammer: and 167, a pin carried by the carriage and adapted to trip the bell at each impulse of the carriage.

While I have chosen to illustrate my invention by means of a machine designed to receive four different denominations of coins and to deal with five differing numbers of unit-purchases, it will be readily apprehended that the principle of action involved will lend itself to any desired number of coins of differing values, and to any desired number of unit-purchases within the range of value of the coin of highest value provided for. And while I have illustrated the invention as designed to deal with coins of the coinage system of the United States, it will be apprehended that the invention will lend itself to other systems of coinage. The fact will also be appreciated that, regardless of the number of different coins provided for, and regardless of the number of unit purchases provided for, and regardless of the system of coinage, the scheme of consolidating a large portion of the mechanism pertaining to the highest value and next highest value coins provided for may be availed of. In other words, the delivery of the next to the highest value coin may be placed under the domination of the mechanism pertaining to the coin of the highest value.

I claim:—

1. A change-maker magazine comprising, a portable vertical tube open at its upper end for the reception of coins and open at its lower end for the downward discharge of coins and having a horizontal slot at its base, a finger adapted to slide into said slot and across the base of the tube and support a pile of coins therein, and means for locking the finger in active position within and across the tube and in inactive position outside the bore of the tube, combined substantially as set forth.

2. A change-maker magazine comprising, a portable vertical tube open at its upper end and for the reception of coins and open at its lower end for the downward discharge of coins and having a horizontal slot at its base and a horizontal slot at its top, a finger adapted to slide into said base slot and across the base of the tube and support a pile of coins therein, a finger adapted to slide into said top slot, and means for locking the fingers in active position within and across the tube and in inactive position outside the bore of the tube, combined substantially as set forth.

3. A change-maker comprising, a vertical tube, a base adapted to separably receive and rigidly support the tube, a slotted finger carried by the tube and adapted to enter horizontally at the base of the tube and support a pile of coins therein, means carried by the tube for locking the finger in active and inactive positions, and a plunger arranged for upward movement in said supporting base at the foot of the tube and adapted to be straddled by said finger, combined substantially as set forth.

4. A change-maker comprising, a series of vertical tubes, a magazine base-plate having the tubes rigidly united to them, a supporting-base for the magazine base-plate, a finger adapted to enter horizontally at each tube and support a pile of coins in each tube, a bar connecting all of said fingers, and means for locking said bar in position corresponding with the active and inactive positions of the fingers, combined substantially as set forth.

5. A change-maker comprising, a base-plate adapted to support a tubular magazine and provided with apertures to permit the downward passage of coins from the magazine, a horizontal upper frame-plate disposed over said base-plate, columns connecting said plates, a series of vertical magazine-tubes, a magazine base-plate rigidly connecting the bases of said tubes and adapted to rest on said base-plate while the upper ends of the tubes are under said upper frame-plate, fingers adapted to enter horizontally at the base of each tube and support a pile of coins therein, a bar secured to all said fingers to serve in moving them simultaneously, and a locking device to serve in locking said bar to position corresponding with the active position of said fingers and in locking the bar to position corresponding with the inactive position of the fingers and simultaneously locking said magazine base-plate to the first-mentioned base-plate, combined substantially as set forth.

6. A change-maker comprising, a base-plate adapted to support a tubular-magazine and provided with apertures to permit the downward passage of coins from the magazine, a horizontal upper frame-plate disposed over said base-plate, columns connecting said plates, a series of vertical magazine-tubes, a magazine base-plate rigidly connecting the bases of said tubes and adapted to rest on said base-plate while the upper ends of the tubes are under said upper frame-plate, fingers adapted to enter horizontally at the base of each tube and support a pile of coins therein, a bar secured to all said fingers to serve in moving them simultaneously, and a dowel-pin engaging said bar and magazine base-plate and first-mentioned base-plate and adapted to serve in locking the magazine base-plate to the first-mentioned base-plate and in locking said bar to position corresponding with the inactive position of the fingers, combined substantially as set forth.

7. A change-maker comprising, a base-plate provided with an aperture for the downward passage of coins, a throated top frame-plate, a portable tubular magazine provided with a base-plate and a top-plate and adapted to take position between said base-plate and throated plate, and adapted to receive coins from the top frame-plate and deliver them through the base-plate and provided with a horizontal slot at its bottom and a horizontal slot at its top, fingers adapted to horizontally enter across the base and top of the magazine-tubes, means for locking the magazine in position between the top frame-plate and the base-plate, and means for locking said fingers in position across the tube or in inactive position outside the bore of the tube, combined substantially as set forth.

8. A change-maker comprising, a base-plate, a throated top frame-plate, a portable tubular magazine provided with a baseplate and a top-plate and adapted to take position between said base-plate and throated plate, fingers adapted to horizontally enter the base and top of the magazine-tubes, and locking devices to serve in locking the magazine in working position on the base-plate and simultaneously locking the fingers at the base of the tubes of the magazine to inactive position, combined substantially as set forth.

9. A change-maker comprising, a base-plate, a throated top frame-plate, a portable tubular magazine provided with a base-plate and a top-plate and adapted to take position between said base-plate and throated plate, fingers adapted to horizontally enter the base and top of the magazine-tubes, a bar connecting the fingers at the base of the several tubes of the magazine to serve in moving the fingers simultaneously, and a movable dowel-pin engaging said bar and the base-plate of the magazine and the base-plate on which the magazine rests, combined substantially as set forth.

10. A portable magazine for a change-maker comprising, a series of parallel vertical magazine tubes, a horizontal plate securing the lower ends of the tubes fixedly together, a horizontal plate securing the upper ends of the tubes fixedly together, a finger adapted to enter horizontally the upper end of each tube, a bar connecting said fingers and rigidly uniting them, a dowel engaging said bar and said upper horizontal plate, a finger adapted to enter horizontally the base of each of the tubes, a bar engaging each of the fingers at the bases of the tubes and rigidly uniting them, and a dowel engaging said bar and the plate at the base of the tubes and projecting downwardly from said plate and adapted to serve in doweling the magazine to a supporting plate, combined substantially as set forth.

11. A change-maker comprising, a series of parallel vertical magazine-tubes, a horizontal plate securing the lower ends of the tubes fixedly together, a horizontal plate securing the upper ends of the tubes fixedly together, a finger adapted to enter horizontally the upper end of each tube, a bar connecting said fingers and rigidly uniting them, a dowel engaging said bar and said upper horizontal plate, a slotted finger adapted to enter horizontally the base of each of the tubes, a bar engaging each of the fingers at the bases of the tubes and rigidly uniting them, a dowel engaging said bar and the plate at the base of the tubes and projecting downwardly from said plate and adapted to serve in doweling the magazine to a supporting plate, a frame base-plate adapted to support the horizontal plate at the lower ends of the tubes, a plunger projecting through said last-mentioned base-plate at the base of each of said tubes and adapted to be straddled by said slotted fingers, a shaft supported by said last-mentioned base-plate at the foot of the tubes, arms projecting from said shaft beneath said plungers and adapted to serve in raising them, springs urging said plungers down to idle position, and a handle on said shaft to serve in rocking the shaft and raising all said plungers simultaneously, combined substantially as set forth.

12. A change-maker comprising, a vertical a magazine-tube, a vertical throat disposed directly over the tube and having a width suited for a given denomination of coin, a rearward offset the wide way of said throat, an opening in one of the wide walls of the throat at said offset of a size adapted to permit the outward passage of a coin of less diameter than that of the coin to which the throat is appropriated, and a removable coin-support disposed in said throat and adapted to temporarily support a coin at said opening, combined substantially as set forth.

13. A change-maker comprising, a vertical magazine-tube, a vertical throat disposed over the tube and having a width suited for a given denomination of coin and having an offset from one of its wide walls toward the other, a yielding coin-supporting stop projecting into the throat below said offset, an arm having a toe projecting into the throat below said offset at a sufficient distance above said stop to permit a coin to take position between the stop and toe, and a finger-piece for depressing said toe to engage a coin and cause it to remove said stop, combined substantially as set forth.

14. A change-maker comprising, a vertical magazine-tube, a vertical throat disposed over the tube and having a width suited for a given denomination of coin and having a downwardly shouldered offset from one of its wide walls toward the other, a yielding coin-supporting stop projecting into the throat below said offset, an arm having a toe projecting into the throat below the shoulder of said offset at a sufficient distance above said stop to permit a coin to take position between the stop and toe, and a finger-piece for depressing said toe to engage a coin and cause it to remove said stop, combined substantially as set forth.

15. A change-maker comprising, a vertical magazine-tube, a vertical throat disposed over the tube and having a width suited for a given denomination of coin, an opening in one of the wide walls of the throat, a yielding stop projecting into the throat and adapted to support a coin opposite said opening, and a hand-operated device to engage over such coin and force it downward against the resistance of said stop, combined substantially as set forth.

16. A change-maker comprising, a vertical magazine-tube, a vertical throat disposed over the tube and having a width suited for a given denomination of coin, a pair of movable stops normally projecting into the throat at one wall thereof, a movable stop adapted to move into the throat at the opposite wall but normally out of the throat, and a finger-piece connected with said stops to serve in moving them simultaneously so that the pair of movable stops move out of the throat while the opposite stop moves into the throat, combined substantially as set forth.

17. A change-maker comprising a vertical magazine-tube, a vertical throat disposed over the tube and having a width suited for a given denomination of coin, a pair of movable stops normally projecting into the throat at one wall thereof, a movable stop adapted to move into the throat at the opposite wall but normally out of the throat, a finger-piece connected with said stops to serve in moving them simultaneously so that the pair of movable stops move out of the throat while the opposite stop moves into the throat, a spring urging the stops to their first-mentioned position, and a spring-latch for holding the stops in their last-mentioned position, combined substantially as set forth.

18. A change-maker comprising, a vertical magazine-tube, a vertical throat disposed over the tube and having a width suited for a given denomination of coin, a pair of movable stops normally projecting into the throat at one wall thereof, a movable stop adapted to move into the throat at the opposite wall but normally out of the throat, a stop adapted to move into the throat at said opposite wall at a point above all of said mentioned stops but normally out of the throat, and a finger-piece connected with said stops to serve in moving them simultaneously so that the pair of movable stops move out of the throat while the opposite stops move into the throat, combined substantially as set forth.

19. A change-maker comprising, a vertical magazine-tube, a vertical throat disposed over the tube and having a width suited for a given denomination of coin, a spring-urged pivoted stop projecting into the throat and adapted to support a coin, a pivoted arm having a toe adapted to engage over a coin supported on said stop and push the coin downward, a finger-piece for moving said toe downward, and a spring to hold the toe to inactive position, combined substantially as set forth.

20. A change-maker comprising, a vertical magazine-tube, a vertical throat disposed over the tube and having a width suited for a given denomination of coin, a spring-urged pivoted stop projecting into the throat and adapted to support a coin, a pivoted arm having a toe adapted to engage over a coin supported on said stop and push the coin downward, a finger-piece for moving said toe downward, a spring to hold the toe to inactive position, a movable stop normally out of the throat but adapted to move into the throat and arrest a coin at such high level that it cannot be engaged by said toe, and means for moving the last-mentioned stop into the throat as said toe descends, combined substantially as set forth.

21. A change-maker comprising, a vertical magazine-tube, a vertical throat disposed over the tube and having a width suited for a given denomination of coin, a spring-urged pivoted stop projecting into the throat and adapted to support a coin, a pivoted arm having a toe adapted to engage over a coin supported on said stop and push the coin downward, a finger-piece for moving said toe downward, a spring to hold the toe to inactive position, a movable stop normally out of the throat but adapted to move into the throat and arrest a coin at such high level that it cannot be engaged by said toe, and connections between the last-mentioned stop and the finger-piece to cause the stop to enter the throat as the toe descends, combined substantially as set forth.

22. A change-maker comprising, a vertical magazine-tube, a vertical throat disposed over the tube and having a width suited for a given denomination of coin, a spring-urged pivoted stop projecting into the throat and adapted to support a coin therein, a pivoted arm having a toe adapted to engage over a coin supported on said stop and push the coin downward, a spring to hold the toe to inactive position, a movable stop normally out of the throat but adapted to move into the throat and arrest a coin at such high level that it cannot be engaged by said toe, a movable stop normally out of the throat but adapted to move into the throat on a level lower than that of said pivoted stop, a finger-piece, and connections between the finger-piece and toe and stops to move them simultaneously when a coin is supported on the pivoted stop, combined substantially as set forth.

23. A change-maker comprising, a vertical magazine-tube, a vertical throat disposed over the tube and having a width suited for a given denomination of coin, a spring-urged pivoted stop projecting into the throat and adapted to support a coin therein, a pivoted arm having a toe adapted to engage over a coin supported on said stop and push the coin downward, a spring to hold the toe to inactive position, a movable stop normally out of the throat but adapted to move into the throat and arrest a coin at such high level that it cannot be engaged by said toe, a movable stop normally out of the throat but adapted to move into the throat on a level lower than that of said pivoted stop, a movable stop normally out of the throat but adapted to move into the throat on a level lower than that of the last-mentioned movable stop, a finger-piece, and connections between the finger-piece and toe and stops to move them simultaneously when a coin is supported on the pivoted stop, combined substantially as set forth.

24. A change-maker comprising a vertical magazine-tube, a vertical throat disposed over the tube and having a width suited for a given denomination of coin, a plate disposed near the throat and adapted for movement at right angles to and widthwise of the throat, stop-pins projecting from said plate into the wall-work of the throat and adapted to enter the throat, a spring to hold said plate in position corresponding with the idle position of some of said stop-pins and the active position of another of said stop-pins, a pivoted stop projecting into the plate and adapted to support a coin, a toe adapted to engage over a coin supported on the pivoted stop, a spring holding the toe to inactive position, a finger-piece, and connections between the finger-piece and toe and plate to move them simultaneously, combined substantially as set forth.

25. A change-maker comprising, a rank of vertical magazine-tubes, a rank of throats disposed over said tubes and adapted each for a given denomination of coin, a plate disposed along said rank of throats and movable endwise of the rank, stop-pins projecting from the plate into the wall-work of the throats and adapted to move into and out of the throats by the endwise movement of the plate, a spring urging the plate to endwise position corresponding with the active position of some of said stop-pins and the inactive position of other pins, a pivoted stop projecting into each throat and adapted to support a coin therein, a toe for each throat adapted to engage over a coin supported on said pivoted stop, a finger-piece for each throat, and operative connections between each of the finger-pieces and the plate and the pivoted stops and toes, combined substantially as set forth.

26. A change-maker comprising, a rank of vertical magazine-tubes, a rank of throats disposed over said tubes and adapted each for a given denomination of coin, a plate disposed along said rank of throats and movable endwise of the rank, pivoted links for supporting said plate and permitting its endwise motion, stop-pins projecting from the plate into the wall-work of the throats and adapted to move into and out of the throats by the endwise movement of the plate, a spring urging the plate to endwise position corresponding with the active position of some of said stop-pins and the inactive position of other pins, a pivoted stop projecting into each throat and adapted to support a coin therein, a toe for each throat adapted to engage over a coin supported on said pivoted stop, a finger-piece for each throat, and operative connections between each of the finger-pieces and the plate and the pivoted stops and toes, combined substantially as set forth.

27. A change-maker comprising, a rank of vertical tubes, a rank of throats disposed over said tubes and adapted each for a given denomination of coin, a plate disposed along said rank of throats and movable endwise of the rank, stop-pins projecting from the plate into the wall-work of the throats and adapted to move into and out of the throats by the endwise movement of the plate, a spring urging the plate to endwise position corresponding with the active position of some of said stop-pins and the inactive position of other pins, a pivoted stop projecting into each throat and adapted to support a coin therein, a toe for each throat adapted to engage over a coin supported on said pivoted stop, a finger-piece for each throat, operative connections between each of the finger-pieces and the plate and the pivoted stops and toes, and a handle to serve in moving said plate endwise independently of the finger-pieces, combined substantially as set forth.

28. A change-maker comprising, a rank of vertical magazine-tubes, a rank of throats disposed over said tubes and adapted each for a given denomination of coin, a plate disposed along said rank of throats and movable endwise of the rank, stop-pins projecting from the plate into the wall-work of the throats and adapted to move into and out of the throats by the endwise movement of the plate, a spring urging the plate to endwise position corresponding with the active position of some of said stop-pins and the inactive position of other pins, a pivoted stop projecting into each throat and adapted to support a coin therein, a toe for each throat adapted to engage over a coin supported on said pivoted stop, a finger-piece for each throat, operative connections between each of the finger-pieces and the plate and the pivoted stops and toes, and a spring-pressed latch to hold the plate in one of its endwise positions, combined substantially as set forth.

29. A change-maker comprising, a base, a skeleton top-frame, columns supporting the top-frame from the base, a vertical tubular magazine separably disposed between the base and top-frame, a throat carried by the top-frame over each tube of the magazine, a plate supported by the top-frame along the rank of throats and arranged for endwise movement, stops carried by the plate and adapted for movement into and out of the throats, a spring urging the plate to one of its endwise positions, a stop projecting into each throat and adapted for movement independent of said plate and adapted to support a coin, a toe in each throat adapted to engage over a coin supported on the last-mentioned stop, a finger-piece for each throat, and operative connections between the finger-pieces and toes and supporting stops and plate to cause the endwise movement of the plate when a finger-piece depresses a toe upon a coin below it, combined substantially as set forth.

30. A change-maker comprising, a base, a skeleton top-frame, columns supporting the top-frame from the base, a vertical tubular magazine separably disposed between the base and top-frame, a throat carried by the top-frame over each tube of the magazine, a plate supported by the top-frame along the rank of throats and arranged for endwise movement, stops carried by the plate and adapted for movement into and out of the throats, a spring urging the plate to one of its endwise positions, a stop projecting into each throat and adapted for movement independent of said plate and adapted to support a coin, a toe in each throat adapted to engage over a coin supported on the last-mentioned stop, a finger-piece for each throat, operative connections between the finger-pieces and toes and supporting stops and plate to cause the endwise movement of the plate when a finger-piece depresses a toe upon a coin below it, and a spring-pressed latch coöperating with the plate and adapted to hold it in the endwise position in which it has been placed by the depression of a finger-key acting on a coin, combined substantially as set forth.

31. A change-maker comprising, a series of vertical magazine tubes adapted each for a single given denomination of coin, a series of vertical throats disposed over the magazine tubes and adapted each for a single given denomination of coin and adapted to permit the dropping of coins through them to their individual magazine tubes, a yielding stop projecting into each throat and adapted to arrest the descent of the coin on its way to its magazine tube, an individual finger-piece disposed at each throat and having a member adapted to engage over a coin arrested by said stop, and means whereby the depression of any individual finger-piece will cause the coin pertaining to that finger-piece to be depressed and displace said stop so that the coin may descend on its way to the magazine tube, combined substantially as set forth.

32. A change-maker comprising, a series of unit-bars appropriated each to a different number of units of purchase, change-determining and change-delivering mechanism to be actuated by the endwise movement of any one of said unit-bars, a finger-key for moving each unit-bar, springs holding the unit-bars normally to inactive position, a unit-bar stop normally preventing the action of any unit-bar, and means for moving the unit-bar stop to release appropriate ones of the unit bars and permit them to make their complete movement, combined substantially as set forth.

33. A change-maker comprising, a series of unit-bars appropriated each to a different number of units of purchase, change-determining and change-delivering mechanism to be actuated by the endwise movement of any one of said unit-bars, a finger-key for moving each unit-bar, springs holding the unit-bars normally to inactive position, a stop-bar carrying stops engaging the unit-bars and normally preventing the action of any unit-bar, and means for moving the stop-bar endwise to release appropriate ones of the unit bars and permit them to make their complete movement, combined substantially as set forth.

34. A change-maker comprising, a series of unit-bars appropriated each to a different number of units of purchase, change-determining and change-delivering mechanism to be actuated by the endwise movement of any one of said unit-bars, a finger-key for moving each unit-bar, springs holding the unit-bars normally to inactive position, a stop-bar engaging the unit-bars and preventing the action of any unit-bar and provided with a notch at one side of each unit-bar, and means for moving the stop-bar endwise to release appropriate ones of the unit bars and permit them to make their complete movement, combined substantially as set forth.

35. A change-maker comprising, a series of unit-bars appropriated each to a different number of units of purchase, change-determining and change-delivering mechanism to be actuated by the endwise movement of any one of said unit-bars, a finger-key for moving each unit-bar, springs holding the unit-bars normally to inactive position, a unit-bar stop normally preventing the action of any unit-bar, a series of coin-receiving throats, a yielding coin-support in each throat, a hand-operated toe in each throat adapted to depress a coin resting upon the yielding coin-support, and means whereby the movement of a yielding coin support moves the unit-bar stop and releases appropriate unit-bars, combined substantially as set forth.

36. A change-maker comprising, a series of unit-bars appropriated each to a different number of units of purchase, change-determining and change-delivering mechanism to be actuated by the endwise movement of any one of said unit-bars, a finger-key for moving each unit-bar, springs holding the unit-bars normally to inactive position, a stop-bar carrying stops engaging the unit-bars and normally preventing the action of any unit-bar, a series of coin-receiving throats, a yielding coin-support in each throat, a hand-operated toe in each throat adapted to depress a coin resting upon the yielding coin-support, and means whereby the movement of a yielding coin-support moves the stop-bar endwise and releases appropriate unit-bars, combined substantially as set forth.

37. A change-maker comprising, a series of unit-bars appropriated each to a different number of units of purchase, change-determining and change-delivering mechanism to be actuated by the endwise movement of any one of said unit-bars, a finger-key for moving each unit bar, springs holding the unit-bars normally to inactive position, a stop-bar engaging the unit-bars and preventing the action of any unit-bar and provided with a notch at one side of each unit-bar, a series of coin-receiving throats, a yielding coin-support in each throat, a hand-operated toe in each throat adapted to depress a coin resting upon the yielding coin-support, and means whereby the movement of a yielding coin-support moves the stop-bar endwise and releases appropriate unit-bars, combined substantially as set forth.

38. A change-maker comprising, a tubular magazine to receive coins, blades working in conjunction with the tubes of the magazine to withdraw coins from the base of the tubes, a single series of unit-purchase keys, means adapted for connecting the keys appropriately with the blades whereby the manipulation of any single unit-purchase key positively operates blades for delivering the change due in the transaction, a lock normally preventing the actuation of the keys, and means for operating said lock to release appropriate keys, combined substantially as set forth.

39. A change-maker comprising, a magazine, change-determining and delivering mechanism coöperating therewith, a single series of finger-keys, connections between the keys and the change-determining and delivering mechanism to cause the actuation of a single key to positively act to deliver the full amount of change due for a given transaction, a lock normally preventing the actuation of the keys, and means for operating said lock to release an appropriate key, combined substantially as set forth.

40. A change-maker comprising, a tubular magazine, a throat for each tube, a yielding coin-support for each throat, hand-operated means adapted to engage over coins resting on said coin supports, change-determining and delivering mechanism adapted for the withdrawal of coins from the base of the tubes of the magazine, a single series of finger-keys, connections between said keys and the change-determining and delivering mechanism to cause the manipulation of a single key to act positively to withdraw from the magazine the change appropriate to a given transaction, a lock normally preventing the actuation of the keys, and connections between said yielding coin-supports and said lock whereby the depression of a coin-support unlocks appropriate keys combined substantially as set forth.

41. A change-maker comprising, a tubular magazine, a throat for each tube, a yielding coin-support for each throat, hand-operated means adapted to engage over coins resting on said coin-supports, change-determining and delivering mechanism adapted for the withdrawal of coins from the base of the tubes of the magazine, a single series of finger-keys, connections between said keys and the change-determining and delivering mechanism to cause the manipulation of a single key to act positively to withdraw from the magazine the change appropriate to a given transaction, an endwise movable lock-bar normally preventing the actuation of the keys, and connections between said yielding coin-supports and said lock-bar whereby the depression of a coin-support moves said lock-bar endwise and unlocks appropriate keys, combined substantially as set forth.

42. A change-maker comprising, a single series of finger-keys designed each to bring about the delivery of change appropriate to a given transaction, locking mechanism normally preventing the actuation of the keys, a coin-receiving feature appropriate for each denomination of coin, a finger-piece for each coin-receiving feature and arranged to act on a coin deposited in such feature, and means adapted to be actuated by the movement of the coin and operate the locking mechanism to release an approprite finger-key, combined substantially as set forth.

43. A change-maker comprising, a vertical tubular magazine, a vertical throat over each tube, a yielding coin-support in each throat, a finger-piece at each throat to engage over a coin resting on said coin-support, change-determining and delivering mechanism adapted for the withdrawal of coins from the base of the tubes of the magazine, a single series of finger-keys, connections between said finger-keys and the change-determining and delivering mechanism to cause the manipulation of a single key to withdraw from the magazine-tubes the change appropriate to a given transaction, locking mechanism normally preventing the actuation of the keys, and connections between the yielding coin-supports and the locking mechanism whereby the operation of a finger-piece may depress a coin and unlock appropriate finger-keys, combined substantially as set forth.

44. A change-maker comprising, a plurality of magazine tubes, blades arranged to slide across the base of the tubes and withdraw coins therefrom, hand-operated means for sliding blades appropriate in making change, an additional magazine-tube, a perforated blade sliding under said additional tube and adapted to be normally charged from the tube and withdraw a coin therefrom, a normally empty perforated blade disposed under the last-mentioned blade to one side of said additional tube and adapted to have a coin delivered to it by the blade above it, and hand-operated means for actuating the upper blade of the additional tube independent of the movement of the other blades, combined substantially as set forth.

45. A change-maker comprising, a plurality of magazine-tubes, blades arranged to slide across the base of the tubes and withdraw a coin therefrom, a change-plate mounted for sliding motion lengthwise of the blades, a series of unit purchase-keys to move the change-plate, an additional magazine-tube, an additional blade mounted below the additional tube but to one side of the tube, an upper additional blade mounted to slide below the additional tube and withdraw a coin therefrom and deliver it to the lower additional blade, normally inactive adjustable pins carried by the plate and adapted to connect the plate appropriately with the blades pertaining to the plurality of magazine-tubes first referred to, means for connecting the plate with the lower blade under the additional magazine-tube so that such blade may be moved by the plate, and means independent of the plate for moving the upper blade of the additional magazine-tube, combined substantially as set forth.

46. A change-maker comprising, a magazine-tube, a perforated blade arranged to slide beneath said tube and be charged from said tube and to withdraw a coin therefrom, a normally empty perforated sliding blade disposed below the first-mentioned blade to one side of the magazine-tube and adapted to receive a coin from the first-mentioned blade, and means for moving said blades independently, combined substantially as set forth.

47. A change-maker comprising, a magazine-tube, a perforated blade arranged to slide beneath the tube and be normally charged therefrom and withdraw a coin therefrom, a normally empty perforated blade arranged beneath the first-mentioned blade at one side of the tube and arranged to slide at right angles to the first-mentioned blade and to receive a coin from the first-mentioned blade, and means for moving said blades independently, combined substantially as set forth.

48. A change-maker comprising, a magazine-tube, a sliding blade disposed below said tube but at one side thereof, a change-plate mounted to slide in the same direction as said blade, a finger-key for moving the plate, a pin carried by said plate and normally in inactive relationship with said blade, an upper blade arranged to slide beneath the tube over the first-mentioned blade and to withdraw a coin from the tube and deliver it to the first-mentioned blade, and means for moving the upper blade and delivering a coin to the first-mentioned blade and for shifting said pin into active relationship with the first-mentioned blade so that the finger-key will effect the delivery of a coin, combined substantially as set forth.

49. A change-maker comprising, a magazine-tube, a sliding blade disposed below said tube but at one side thereof, a change-plate mounted to slide in the same direction as said blade, a finger-key for moving the plate, a pin carried by said plate and normally in inactive relationship with said blade, an upper blade arranged to slide beneath the tube and over the first-mentioned blade and to withdraw a coin from the tube and deliver it to the first-mentioned blade, a second magazine-tube for coins larger than those pertaining to the first-mentioned tube, a throat over the second magazine-tube, a finger-piece at said throat to be actuated when a coin is deposited therein, and connections to serve in moving said upper blade and in moving said pin to active position on the lower blade when said finger-piece is actuated, combined substantially as set forth.

50. A change-maker comprising, a magazine-tube, a sliding blade disposed below said tube but at one side thereof, a change-plate mounted to slide in the same direction as said blade, a finger-key for moving the plate, a pin carried by said plate and normally in inactive relationship with said blade, an upper blade arranged to slide beneath the tube and over the first-mentioned blade and to withdraw a coin from the tube and deliver it to the first-mentioned blade, a second magazine-tube for coins larger than those pertaining to the first-mentioned tube, a throat over the second magazine-tube, a yielding coin-support in the throat, a finger-piece arranged to engage and depress a coin resting on said coin-support, and connections between said coin-support and said pin and said upper blade to move the upper blade and cause said pin to take active position with reference to the lower blade, combined substantially as set forth.

51. A change-maker comprising, a magazine-tube, a blade arranged to slide across the tube and withdraw the lowermost coin therefrom, a second blade overlying the first blade and adapted to slide with it and withdraw the coin next above the lowermost coin, a sliding agent adapted to give sliding motion to the blades, an adjustable pin carried by said sliding agent in normally inactive relationship to the blades, and means for adjusting the pin to couple either the lower blade alone or both blades to the sliding agent, combined substantially as set forth.

52. A change-maker comprising, magazine-tubes, blades arranged to slide across the base of the tubes and withdraw coins therefrom, a change-plate mounted for sliding motion lengthwise of the blades, a series of unit-purchase keys, connections between said keys and plate to cause the plate to be moved a constant distance upon the manipulation of any one of the keys, normally inactive adjustable pins carried by the plate and adapted to serve in connecting the plate with appropriate blades, and means for adjusting appropriate pins to engage with the blades, combined substantially as set forth.

53. A change-maker comprising, magazine-tubes, blades arranged to slide across the base of the tubes and withdraw coins therefrom, a change-plate mounted for sliding motion lengthwise of the blades, a series of unit-purchase keys, connections between said keys and plate to cause the plate to be moved a constant distance upon the manipulation of any one of the keys, normally inactive adjustable pins carried by the plate and adapted to serve in connecting the plate with appropriate blades, a throat over each magazine-tube, a yielding coin-support in each throat, a hand-operated device at each throat to act on a coin on the coin-support and move the latter, and means actuated by the movement of the coin-supports and coöperating with the pins and serving to put appropriate pins in position for active engagement with the blades, combined substantially as set forth.

54. A change-maker comprising, magazine-tubes, blades arranged to slide across the base of the tubes and withdraw coins therefrom and provided with a plurality of pin-receiving holes, a change-plate mounted for sliding motion lengthwise of the blades, a series of unit-purchase keys, connections between said keys and plate to cause the plate to be moved a constant distance upon the manipulation of any one of the keys, normally inactive adjustable pins carried by the plate and adapted to serve in connecting the plate with appropriate blades, and means for adjusting appropriate pins to engage with appropriate holes in the blades, combined substantially as set forth.

55. A change-maker comprising, magazine-tubes, blades arranged to slide across the base of the tubes and withdraw coins therefrom, a change-plate mounted for sliding motion lengthwise of the blades, a series of unit-purchase keys, connections between said keys and plate to cause the plate to move a constant distance upon the manipulation of any one of the keys, normally inactive adjustable pins carried by the plate and adapted to serve in connecting the plate with appropriate blades, and means whereby the keys adjust appropriate pins to active position, combined substantially as set forth.

56. A change-maker comprising, magazine-tubes, blades arranged to slide across the base of the tubes and withdraw coins therefrom, a change-plate mounted for sliding motion length-endwise of the blades, a series of unit-purchase keys, connections between said keys and plate to cause the plate to move a constant distance upon the manipulation of any one of the keys, normally inactive adjustable pins carried by the plate and adapted to serve in connecting the plate with appropriate blades, and means whereby the keys adjust appropriate pins to active position before moving the plate, combined substantially as set forth.

57. A change-maker comprising, magazine-tubes, blades arranged to slide across the base of the tubes and withdraw coins therefrom, a change-plate mounted for sliding motion lengthwise and crosswise of the blades, a series of unit-purchase keys, connections between said keys and plate to cause the plate to move a constant distance upon the manipulation of any one of the keys, normally inactive adjustable pins carried by the plate and adapted to serve in connecting the plate with appropriate pins upon the crosswise shifting of the plate and the endwise movement of the pins, means for shifting the plate crosswise, and connections between the keys and pins to cause the keys to move the pins endwise into active relationship with appropriate blades, combined substantially as set forth.

58. A change-maker comprising, magazine-tubes, blades arranged to slide across the base of the tubes and withdraw coins therefrom, a change-plate mounted for sliding motion lengthwise and crosswise of the blades, a series of unit-purchase keys, connections between said keys and plate to cause the plate to move a constant distance upon the manipulation of any one of the keys, normally inactive adjustable pins carried by the plate and adapted to serve in connecting the plate with appropriate pins upon the crosswise shifting of the plate and the endwise movement of the pins, means for shifting the plate crosswise, and connections between the keys and pins to cause the keys to move the pins endwise into active relationship with appropriate blades before moving the plate, combined substantially as set forth.

59. A change-maker comprising, magazine-tubes, blades arranged to slide across the base of the tubes and withdraw coins therefrom, a change-plate mounted for sliding motion lengthwise and crosswise of the blades, a series of unit-purchase keys, an impelling agent moved by each unit-key to serve in causing the unit-key to move the plate, lugs projecting from the plate to one side of the path of the impelling agents, means for shifting the plate crosswise to bring one of the lugs in the path of one of the impelling agents, normally inactive adjustable pins carried by the plate and adapted to serve in connecting the plate with appropriate blades, and means for adjusting appropriate pins into active relationship with the blades, combined substantially as set forth.

60. A change-maker comprising, magazine-tubes, blades arranged to slide across the base of the tubes and withdraw coins therefrom, a carriage mounted for sliding motion lengthwise of the blades, a change-plate mounted for crosswise motion in the carriage and moving lengthwise of the blades with the carriage, a series of unit-purchase keys, connections between the keys and plate to cause the plate to move a constant distance upon the manipulation of any one of the keys, normally inactive adjustable pins carried by the plate and adapted to serve in connecting the plate with appropriate blades, and means for shifting the plate crosswise in the carriage to bring appropriate pins into proper relationship to appropriate blades, combined substantially as set forth.

61. A change-maker comprising, magazine-tubes, blades arranged to slide across the base of the tubes and withdraw coins therefrom, a change-plate mounted for sliding motion lengthwise and crosswise of the blades, a series of unit-purchase keys, connections between said keys and plate to cause the plate to move a constant distance upon the manipulation of any one of the keys, a throat for each tube, a hand-operated movable agent for each throat, normally inactive adjustable pins carried by the plate and adapted to serve in connecting the plate with appropriate blades, impelling agents moved by the unit-keys to serve in giving movement to the plate lengthwise of the blades, lugs projecting from the plate to one side of the paths of the impelling agents, and connections between said hand-operated movable agents and the plate to shift the plate crosswise, combined substantially as set forth.

62. A change-maker comprising, magazine-tubes, blades arranged to slide across the base of the tubes and withdraw coins therefrom, a change-plate mounted for sliding motion lengthwise and crosswise of the blades, a series of unit-purchase keys, connections between said keys and plate to cause the plate to move a constant distance upon the manipulation of any one of the keys, a throat for each tube, a yielding coin-support for each throat, a finger-piece mounted over each coin-support and adapted to engage over a coin resting on the coin-support, normally inactive adjustable pins carried by the plate and adapted to serve in connecting the plate with appropriate blades, impelling agents moved by the unit-keys to serve in giving movement to the blade lengthwise of the blades, lugs projecting from the plate to one side of the paths of the impelling agents, and connections between said finger-pieces and the plate to shift the plate crosswise, combined substantially as set forth.

63. A change-maker comprising, a series of magazine-tubes, a throat for each tube, a finger-piece at the throat adapted to depress a coin in the throat, blades mounted to slide below the tubes and withdraw coins therefrom, a series of unit-purchase keys, a locking device normally preventing the action of any key, adjustable change-determining and delivering mechanism to appropriately connect the blades with the keys, and connections from the throats to said locking device and change-determining and delivering mechanism whereby the depression of a coin in a throat unlocks an appropriate key and adjusts the change-determining and change-delivering mechanism, combined substantially as set forth.

64. A change-maker comprising, a series of magazine-tubes, a throat for each tube, blades to slide across the bases of the tubes and withdraw coins therefrom, a carriage sliding endwise of the blades, a plate sliding with the carriage and also sliding crosswise of the blades, a series of unit-purchase keys, a series of unit-shafts mounted below the plate and appropriated one for each unit-purchase key, unit-bars connecting each key with its appropriate unit-shaft whereby a key may rock its shaft, impelling arms on the shafts, lugs carried by the plate to one side of the paths of the impelling arms, normally inactive adjustable pins carried by the plate to serve in connecting the plate with appropriate blades, a yielding coin-support in each throat, a finger-piece at each throat to serve in depressing a coin and moving the coin-support on which it rests, a lock-bar normally holding the unit-bars against movement, means for adjusting the pins into active relationship with appropriate blades, and coin-indicating rods connecting the finger-pieces with the lock-bar and plate to cause the movement of a coin-support to unlock appropriate unit-bars and adjust the plate crosswise to bring one of its lugs in the path of an appropriate impelling arm, combined substantially as set forth.

65. A change-maker comprising, a series of magazine-tubes, a throat for each tube, blades to slide across the base of the tubes and withdraw coins therefrom, a carriage sliding endwise of the blades, a plate sliding with the carriage and also sliding crosswise of the blades, a series of unit-purchase keys, a series of unit-shafts mounted below the plate and appropriated one for each unit-purchase key, unit-bars connecting each key with its appropriate unit-shaft whereby a key may rock its shaft, impelling arms on the shafts, lugs carried by the plate to one side of the paths of the impelling arms, a lug carried by the plate constantly in the path of one of the impelling arms so that the activity of that arm is independent of the crosswise shifting of the plate, normally inactive adjustable pins carried by the plate to serve in connecting the plate with appropriate blades, a yielding coin-support in each throat, a finger-piece at each throat to serve in depressing a coin and moving the coin-support on which it rests, a lock-bar normally holding the unit-bars against movement, means for adjusting the pins into active relationship with appropriate blades, and coin-indicating rods connecting the finger-pieces with the lock-bar and plate to cause the movement of a coin-support to unlock appropriate unit-bars and adjust the plate crosswise to bring one of its lugs in the path of an appropriate impelling arm, combined substantially as set forth.

66. A change-maker comprising, a series of magazine-tubes, a throat for each tube, blades to slide across the bases of the tubes and withdraw coins therefrom, a carriage sliding endwise of the blades, a plate sliding with the carriage and also sliding crosswise of the blades, a series of unit-purchase keys, a series of unit-shafts mounted below the plate and appropriated one for each unit-purchase key, unit-bars connecting each key with its appropriate unit-shaft whereby a key may rock its shaft, impelling arms on the shafts, lugs carried by the plate to one side of the paths of the impelling arms, normally inactive adjustable pins carried by the plate to serve in connecting the plate with appropriate blades, a yielding coin-support in each throat, a finger-piece at each throat to serve in depressing a coin and moving the coin-support on which it rests, a lock-bar normally holding the unit-bars against movement, means for adjusting the pins into active relationship with appropriate blades, a projection from the plate adapted to engage the lock-bar and shift it to appropriate unlocking position when the plate is shifted crosswise, rock-shafts disposed parallel with the unit-bars, arms on the rock-shafts to shift the plate sidewise, and coin-indicating rods connecting the finger-pieces with the rock-shafts to cause the movement of a coin-support to shift the plate crosswise to bring one of its lugs in the path of an impelling arm and to appropriately shift the lock-bar, combined substantially as set forth.

67. A change-maker comprising, a series of magazine-tubes, a throat for each tube, blades to slide across the bases of the tubes and withdraw coins therefrom, a carriage sliding endwise of the blades, a plate sliding with the carriage and also sliding crosswise of the blades, a series of unit-purchase keys, a series of unit-shafts mounted below the plate and appropriated one for each unit-purchase key, unit-bars connecting each key with its appropriate unit-shaft whereby a key may rock its shaft, impelling arms on the shafts, lugs carried by the plate to one side of the paths of the impelling arms, normally inactive adjustable pins carried by the plate to serve in connecting the plate with appropriate blades, a yielding coin-support in each throat, a finger-piece at each throat to serve in depressing a coin and moving the coin-support on which it rests, a lock-bar normally holding the unit-bars against movement, means for adjusting the pins into active relationship with appropriate blades, a projection from the plate adapted to engage the lock-bar and shift it to appropriate unlocking position when the plate is shifted crosswise, rock-shafts disposed parallel with the unit-bars, arms on the rock-shafts to shift the plate sidewise, coin-indicating-rods connecting the coin-supports with the rock-shafts to cause the movement of a coin-support to shift the plate crosswise to bring one of its lugs in the path of an impelling arm and to appropriately shift the lock-bar, a rocking-arm adapted to shift the lock-bar to releasing position appropriate to the one-unit unit-bar, a toe on the cam to retain the lock-bar in released position, a coin-indicating rod connected with the finger-pieces of the magazine-throat of lowest value and with said cam, and an incline carried by the plate and adapted to engage the lock-bar and shift it to permit the disengagement of said cam, combined substantially as set forth.

68. A change-maker comprising, a series of magazine-tubes, a throat for each tube, blades to slide across the bases of the tubes and withdraw coins therefrom, a carriage sliding endwise of the blades, a plate sliding with the carriage and also sliding crosswise of the blades, a series of unit-purchase keys, a series of unit-shafts mounted below the plate and appropriated one for each unit-purchase key, unit-bars connecting each key with its appropriate unit-shaft whereby a key may rock its shaft, impelling arms on the shafts, lugs carried by the plate to one side of the paths of the impelling arms, normally inactive adjustable pins carried by the plate to serve in connecting the plate with appropriate blades, a yielding coin-support in each throat, a finger-piece at each throat to serve in depressing a coin and moving the coin-support on which it rests, a lock-bar normally holding the unit-bars against movement, cams turning with the rock-shafts and adapted to push up to active position any pins which may be brought over them by the sidewise shifting of the plate, and coin-indicating rods connecting the finger-pieces with the lock-bar and plate to cause the movement of a coin-support to unlock appropriate unit-bars and adjust the plate crosswise to bring one of its lugs in the path of an appropriate impelling arm, combined substantially as set forth.

69. A change-maker comprising within its mechanism, a carriage, a guideway for the carriage, a pin-carrying plate moving with and adjustable sidewise in the carriage, a detent carried by the plate and coöperating with detent notches in the carriage to hold the plate in position of sidewise adjustment, a spring urging the plate to normal sidewise position, and a projection carried by the guideway and adapted to engage and release the detent by the movement of the carriage, combined substantially as set forth.

70. A change-maker comprising within its mechanism, a pair of magazine tubes for coins of diverse value, a throat for each tube, a yielding coin-support for each throat, a finger-piece at each throat to act on coins on the coin-supports, a sidewise adjustable blade-moving plate, coin-indicating rods connected with each finger-piece, a single transmitting mechanism between said rods and plate, and a lost-motion device included in said mechanism for causing the plate to be shifted by the movement of one of said rods but not the other, combined substantially as set forth.

71. A change-maker comprising in its mechanism, magazine-tubes, a throat for each tube, a yielding coin-support in each throat, a finger-piece for each coin-support, change-determining and change-delivering mechanism, a coin-indicating rod serving to connect the change-determining and change-delivering mechanism with each finger-piece, and a let-go device connecting each coin-indicating rod with its coin-support to cause the coin-indicating rod to be moved by the coin-support and releaséd for return independent of the return-movement of the coin-support, combined substantially as set forth.

72. A change-maker comprising in its mechanism, a blade-moving plate, pins movable through the plate, springs urging the pins to inactive position, a shoe on each pin, and rocking cams adapted to engage appropriate shoes and increase the projection of their pins through the plate, combined substantially as set forth.

73. A change-maker comprising in its mechanism, a blade-moving plate, adjustable pins carried by the plate, means for shifting the plate sidewise, and blades disposed over the plate and having apertures extending crosswise of the blades to receive said pins, combined substantially as set forth.

74. A change-maker comprising in its mechanism, a carriage, a series of unit-purchase keys adapted each to move the carriage a constant distance and appropriated each to a different number of unit-purchases, a plate moving with the carriage and movable crosswise in it, and a detent to hold the plate in various crosswise positions in the carriage during the active movement of the carriage, combined substantially as set forth.

75. A change-maker comprising in its mechanism, a movable carriage, a series of blades, a plate carried by the carriage and movable crosswise in it and adapted for the movement of the before-mentioned blades, an additional blade not held by said plate, band operated means independent of the plate, a bell, and means for causing each active impulse of the carriage to produce a stroke of the bell, combined substantially as set forth.

76. A change-maker comprising in its mechanism, a series of magazine tubes suited each to a single denomination of coin, a series of blades for delivering change from said tubes as called for by the value of a coin deposited in the machine minus the value of a purchase, a blade-moving plate for actuating said blades, an additional magazine tube, an additional blade for delivering a plurality of coins from said additional tube in full exchange for money not deposited in the machine, and hand-operated means independent of said plate for moving the last-mentioned blade, combined substantially as set forth.

77. A change-maker comprising in its mechanism, a series of magazine tubes suited each to a single denomination of coin, a series of blades for delivering change from said tubes as called for by the value of a coin deposited in the machine minus the value of a purchase, a blade-moving plate for actuating said blades, an additional magazine tube, an additional blade for delivering a plurality of coins from said additional tube in full exchange for money not deposited in the machine, hand-operated means independent of said plate for moving the last-mentioned blade, and a counter for indicating the number of impulses which have been given to the last-mentioned blade, combined substantially as set forth.

78. A change-maker comprising in its mechanism, a series of magazine tubes suited each to a single denomination of coin, a series of blades for delivering change from said tubes as called for by the value of a coin deposited in the machine minus the value of a purchase, a blade-moving plate for actuating said blades, an additional magazine tube, an additional blade for delivering a plurality of coins from said additional tube in full exchange for money not deposited in the machine, hand-operated means independent of said plate for moving the last-mentioned blade, a drawer, an automatic latch therefor, and means coöperating with said latch and hand operated means to unlatch the drawer at each impulse of the last-mentioned blade, combined substantially as set forth.

79. A change-maker comprising in its mechanism a blade-moving plate, normally inactive movable pins therein, unit-shafts under the plate, cams on the unit-shafts to adjust the pins to active position, lugs projecting from the plate, and impelling arms on the unit-shafts to engage said lugs and move the plate after the cams have adjusted the pins, combined substantially as set forth.

80. A change-maker comprising in its mechanism, a blade-moving plate having fore-and-aft crosswise motion, unit-shafts below the plate, impelling arms rocked by said shafts, a flipping toe on one of said impelling arms, lugs projecting from the plate to one side of the paths over the impelling fingers except the one with the flipping toe, means for shifting the plate crosswise to bring lugs into the paths of impelling arms, and a wide lug on the plate constantly in the path of the impelling arm with the flipping toe, combined substantially as set forth.

81. A change-maker comprising in its mechanism, a series of unit-bars each pertaining to a different number of unit-purchases and all movable to the same extent, a coin-shaft crossing near said unit-bars, a counter connected with said coin-shaft to indicate the total number of unit-purchases accumulated, a ratchet-wheel on the coin-shaft at each unit-bar, a pawl carried by each unit-bar at its appropriate ratchet-wheel, and teeth carried by the pawls and engaging the ratchet-wheels, a number of teeth varying on all of the pawls and being in correspondence with the unit-value of the several unit-bars, combined substantially as set forth.

82. A change-maker comprising in its mechanism, change-determining and change-delivering mechanism, coin-receiving throats, finger-pieces at the throats, coin-indicating rods extending from the change-determining and delivering mechanism to the finger-pieces, racks pivoted to the coin-indicating rods, a fulcrum for each rack toothed segment carried by the finger-pieces and adapted to engage the racks, and a knockout-tooth on each segment to disengage the rack from the segment after the rack has been moved a proper distance, combined substantially as set forth.

83. A change-maker comprising, a base, a separable tubular magazine supported at the front of the base, change-receiving pouches at the front of the base, a throat over each magazine-tube, a finger-piece at each throat, coin-pressing means in the throats to be actuated by the finger-pieces, blades disposed fore-and-aft under the magazine-tubes and extending to the rear thereof, change-determining and delivering mechanism disposed in the base under the rear portion of the blades and adapted for connection with the blades, and a series of unit-purchase keys disposed at the rear of the base and each adapted to act individually on the change-determining and delivering mechanism and effect the delivery of all of the change pertaining to a given transaction, combined substantially as set forth.

JOSEPH F. HIBNER.

Witnesses:
JNO. D. ANDREWS,
M. S. BELDEN.